United States Patent
Kogo et al.

(10) Patent No.: US 10,066,533 B2
(45) Date of Patent: Sep. 4, 2018

(54) FILTER FAILURE DIAGNOSTIC DEVICE FOR AN INTERNAL COMBUSTION ENGINE

(71) Applicant: TOYOTA JIDOSHA KABUSHIKI KAISHA, Toyota-shi, Aichi (JP)

(72) Inventors: Tomoyuki Kogo, Gotemba (JP); Makoto Ogiso, Mishima (JP); Taiga Hagimoto, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 68 days.

(21) Appl. No.: 15/324,406

(22) PCT Filed: Jul. 8, 2015

(86) PCT No.: PCT/JP2015/003445
§ 371 (c)(1),
(2) Date: Jan. 6, 2017

(87) PCT Pub. No.: WO2016/006242
PCT Pub. Date: Jan. 14, 2016

(65) Prior Publication Data
US 2017/0184003 A1    Jun. 29, 2017

(30) Foreign Application Priority Data

Jul. 8, 2014   (JP) ................................. 2014-140936
Jun. 22, 2015  (JP) ................................. 2015-125153

(51) Int. Cl.
*F01N 11/00* (2006.01)
*F01N 9/00* (2006.01)
(Continued)

(52) U.S. Cl.
CPC ............. *F01N 11/00* (2013.01); *F01N 3/021* (2013.01); *F01N 9/002* (2013.01); *F01N 9/005* (2013.01);
(Continued)

(58) Field of Classification Search
CPC .......... F01N 11/00; F01N 3/021; F01N 9/002; F01N 9/005; F02D 41/26; F02D 41/222;
(Continued)

(56) References Cited

U.S. PATENT DOCUMENTS

| 8,778,290 B1 * | 7/2014 | Ren ......................... F01N 3/103 |
| | | 423/213.2 |
| 2006/0185336 A1 * | 8/2006 | Nakano .................. B01J 20/165 |
| | | 55/524 |

(Continued)

FOREIGN PATENT DOCUMENTS

| JP | 2007-315275 A | 12/2007 | |
| JP | 2011252423 A * | 12/2011 | ......... B01D 46/0086 |
| JP | 2016028194 A * | 2/2016 | ............. F01N 9/002 |

*Primary Examiner* — Joseph Dallo
(74) *Attorney, Agent, or Firm* — Sughrue Mion, PLLC

(57) ABSTRACT

A device is provided, which makes it possible to perform a failure diagnostics for a filter more accurately even in the case of an internal combustion engine which is constructed to be capable of using both of gaseous fuel and liquid fuel. The device of the invention comprises judging means which judges any failure of the filter by comparing the added-up amount of the particulate matter contained in the exhaust gas as detected by a PM amount detecting sensor during a predetermined period and the added-up amount of the particulate matter contained in the exhaust gas as estimated by PM amount estimating means during the predetermined period, wherein the PM amount estimating means estimates the added-up amount of the particulate matter contained in the exhaust gas on the basis of the predetermined parameter and only a fuel injection amount of the liquid fuel out of a fuel injection amount of the gaseous fuel and the fuel injection amount of the liquid fuel.

9 Claims, 16 Drawing Sheets

(51) Int. Cl.
*F01N 3/021* (2006.01)
*F02D 19/08* (2006.01)
*F02D 41/22* (2006.01)
*F02D 41/26* (2006.01)
*F02D 19/06* (2006.01)

(52) U.S. Cl.
CPC ..... *F02D 19/0613* (2013.01); *F02D 19/0642* (2013.01); *F02D 19/081* (2013.01); *F02D 41/222* (2013.01); *F02D 41/26* (2013.01); F01N 11/002 (2013.01); F01N 2550/04 (2013.01); F01N 2560/05 (2013.01); F01N 2900/0418 (2013.01); F01N 2900/0601 (2013.01); F01N 2900/08 (2013.01); F01N 2900/1404 (2013.01); F01N 2900/1411 (2013.01); *F02D 19/0615* (2013.01); *F02D 19/0623* (2013.01); *F02D 19/0647* (2013.01); Y02T 10/36 (2013.01); Y02T 10/47 (2013.01)

(58) Field of Classification Search
CPC ............. F02D 19/0613; F02D 19/0642; F02D 19/081; F02D 19/0615; F02D 19/0623; F02D 2900/1411; Y02T 10/47; Y02T 10/36
See application file for complete search history.

(56) References Cited

U.S. PATENT DOCUMENTS

| | | | | |
|---|---|---|---|---|
| 2007/0137177 A1* | 6/2007 | Kittelson | ............... | F01N 11/007 60/277 |
| 2008/0141757 A1* | 6/2008 | Atkinson | ............... | F01N 3/0205 73/23.31 |
| 2008/0155964 A1* | 7/2008 | Kilkenny | ............... | F01N 9/002 60/286 |
| 2008/0155971 A1* | 7/2008 | Driscoll | ............... | B01D 53/60 60/298 |
| 2008/0295486 A1* | 12/2008 | Crowell | ............... | F01N 3/025 60/274 |
| 2010/0115930 A1* | 5/2010 | Brown | ............... | F01N 3/035 60/297 |
| 2010/0180577 A1* | 7/2010 | Gonze | ............... | B01D 46/42 60/277 |
| 2011/0131950 A1* | 6/2011 | Parnin | ............... | F01N 3/027 60/274 |
| 2011/0131954 A1* | 6/2011 | Parnin | ............... | F01N 3/027 60/276 |
| 2011/0239624 A1* | 10/2011 | Li | ............... | B01D 53/9477 60/274 |
| 2011/0320103 A1* | 12/2011 | Liu | ............... | F01N 3/035 701/102 |
| 2012/0067026 A1* | 3/2012 | Gonze | ............... | F01N 3/035 60/274 |
| 2012/0144802 A1* | 6/2012 | Driscoll | ............... | F01N 3/0253 60/274 |
| 2013/0025266 A1* | 1/2013 | Li | ............... | F01N 3/103 60/287 |
| 2013/0138291 A1* | 5/2013 | Liu | ............... | F01N 9/002 701/34.4 |
| 2013/0291526 A1* | 11/2013 | Gonze | ............... | F01N 3/027 60/311 |
| 2014/0230532 A1* | 8/2014 | Huq | ............... | F01N 11/00 73/114.69 |
| 2015/0275738 A1* | 10/2015 | Van Nieuwstadt | ............... | B01D 46/0086 73/114.76 |
| 2016/0069241 A1* | 3/2016 | Takaoka | ............... | F01N 9/00 60/277 |
| 2016/0169784 A1* | 6/2016 | Smith | ............... | F01N 9/002 73/23.33 |
| 2016/0237873 A1* | 8/2016 | Fujie | ............... | F01N 3/035 |

* cited by examiner

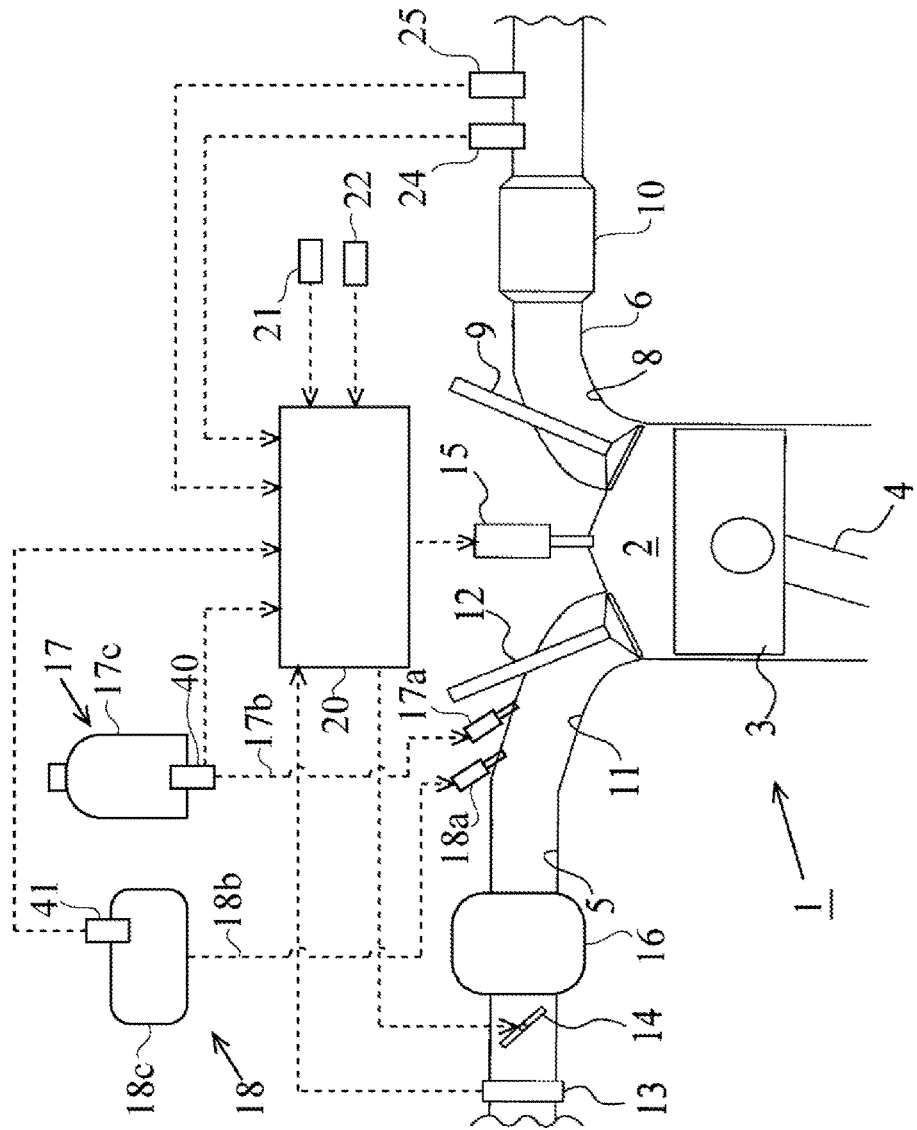
[Fig. 1]

[Fig. 2]
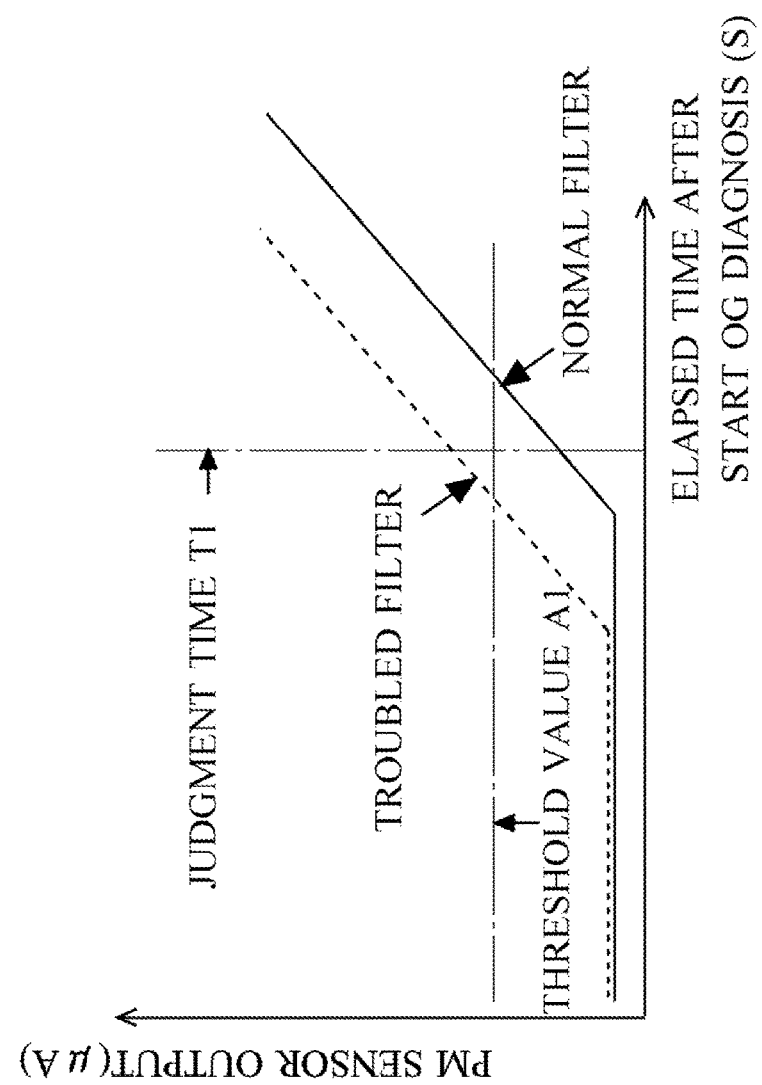

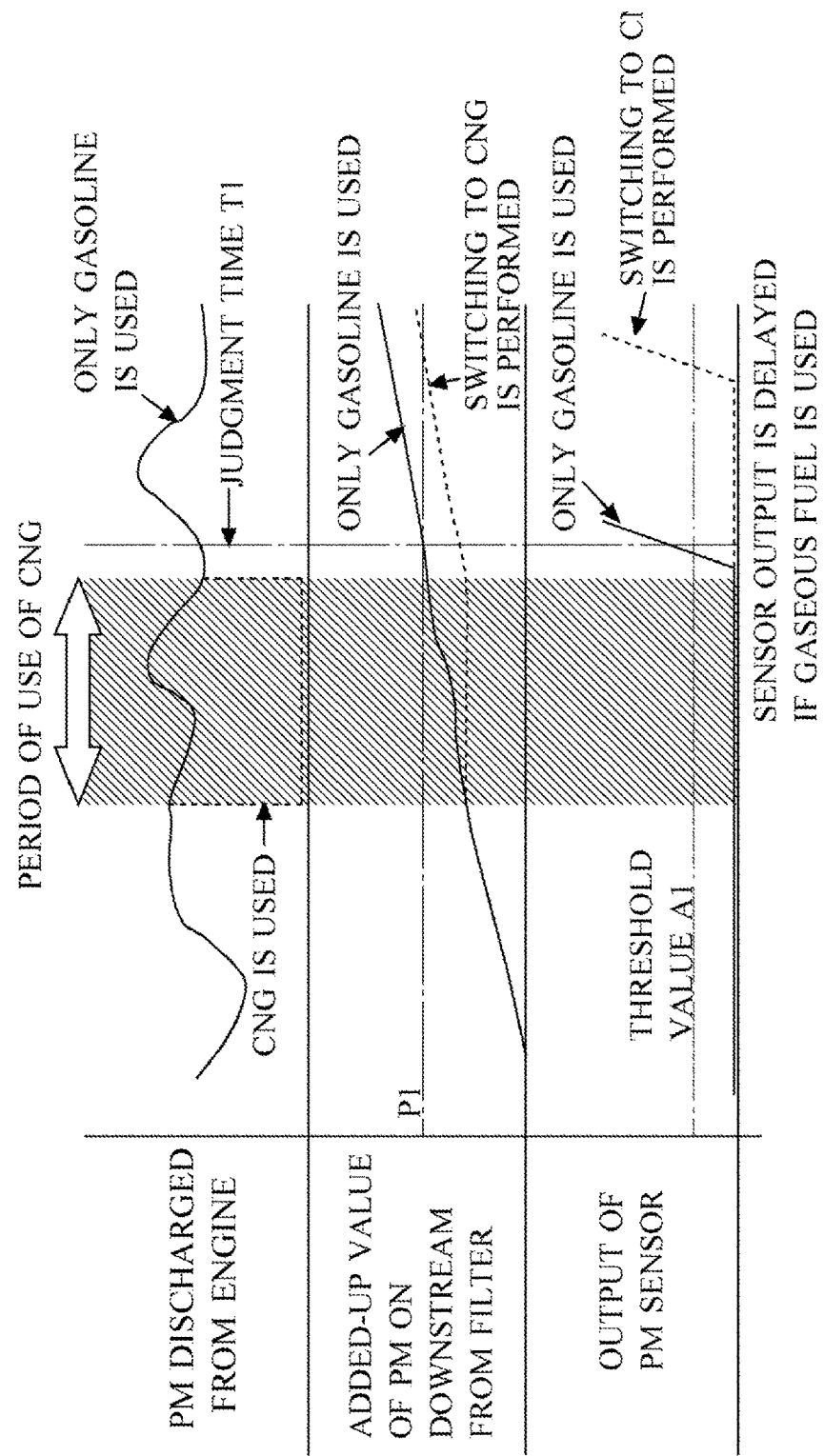
[Fig. 3]

[Fig. 4]
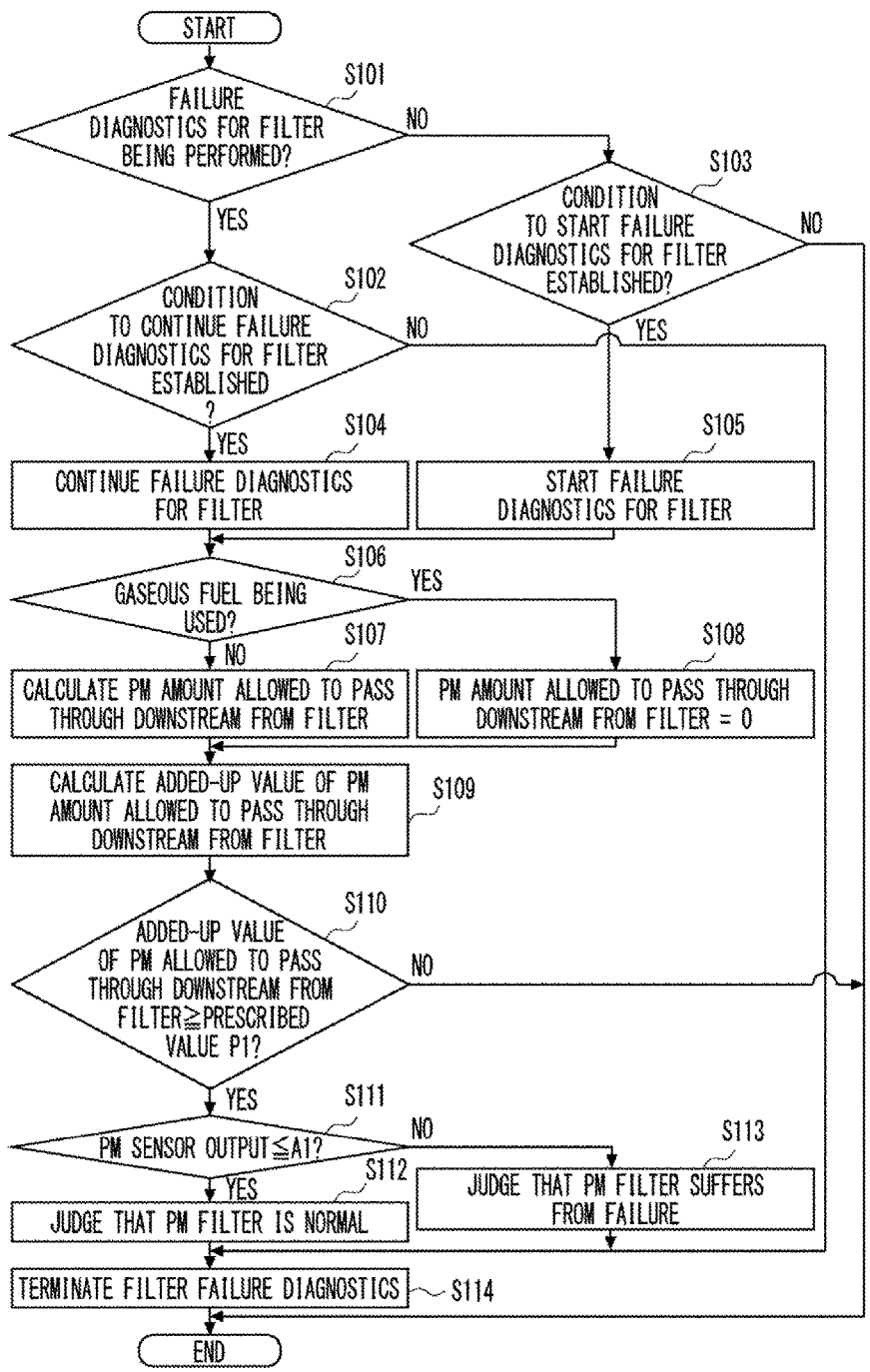

[Fig. 5]
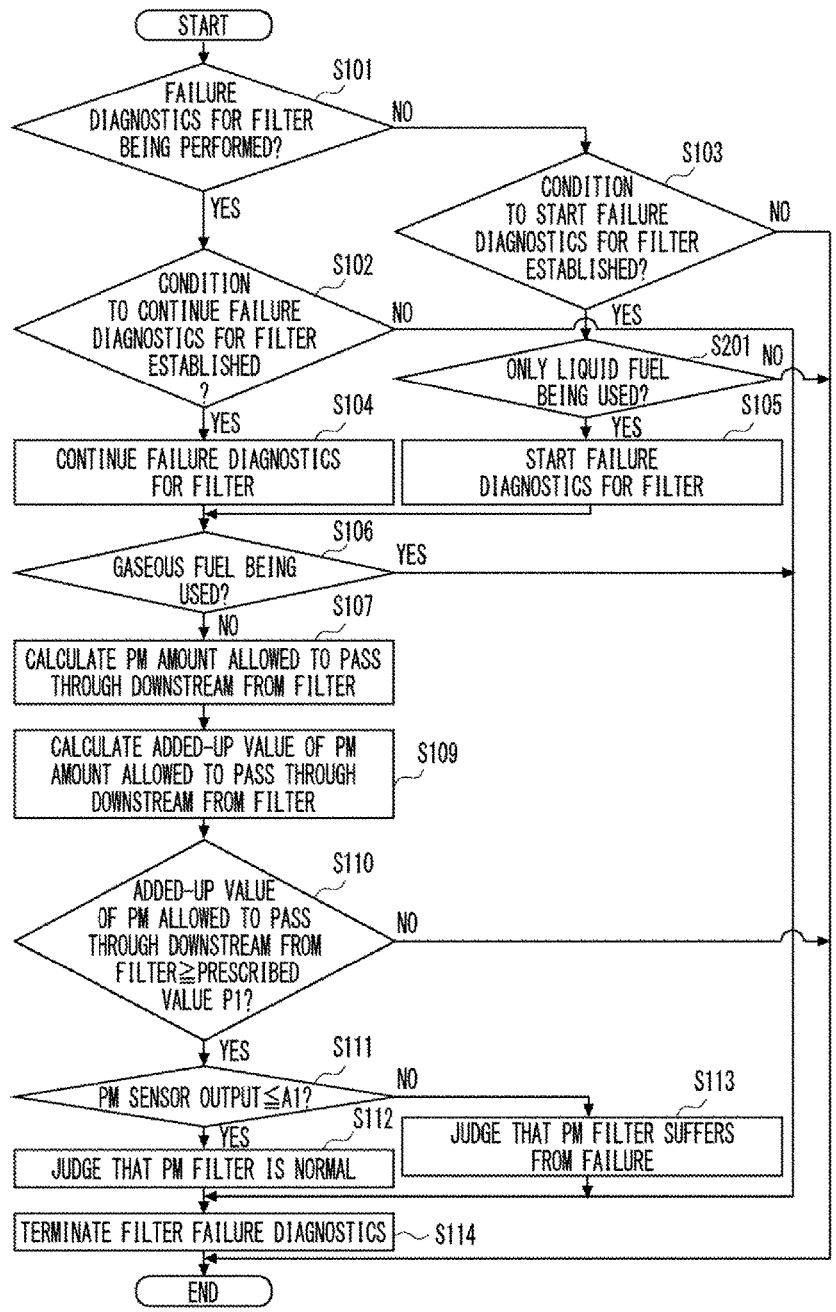

[Fig. 6A]
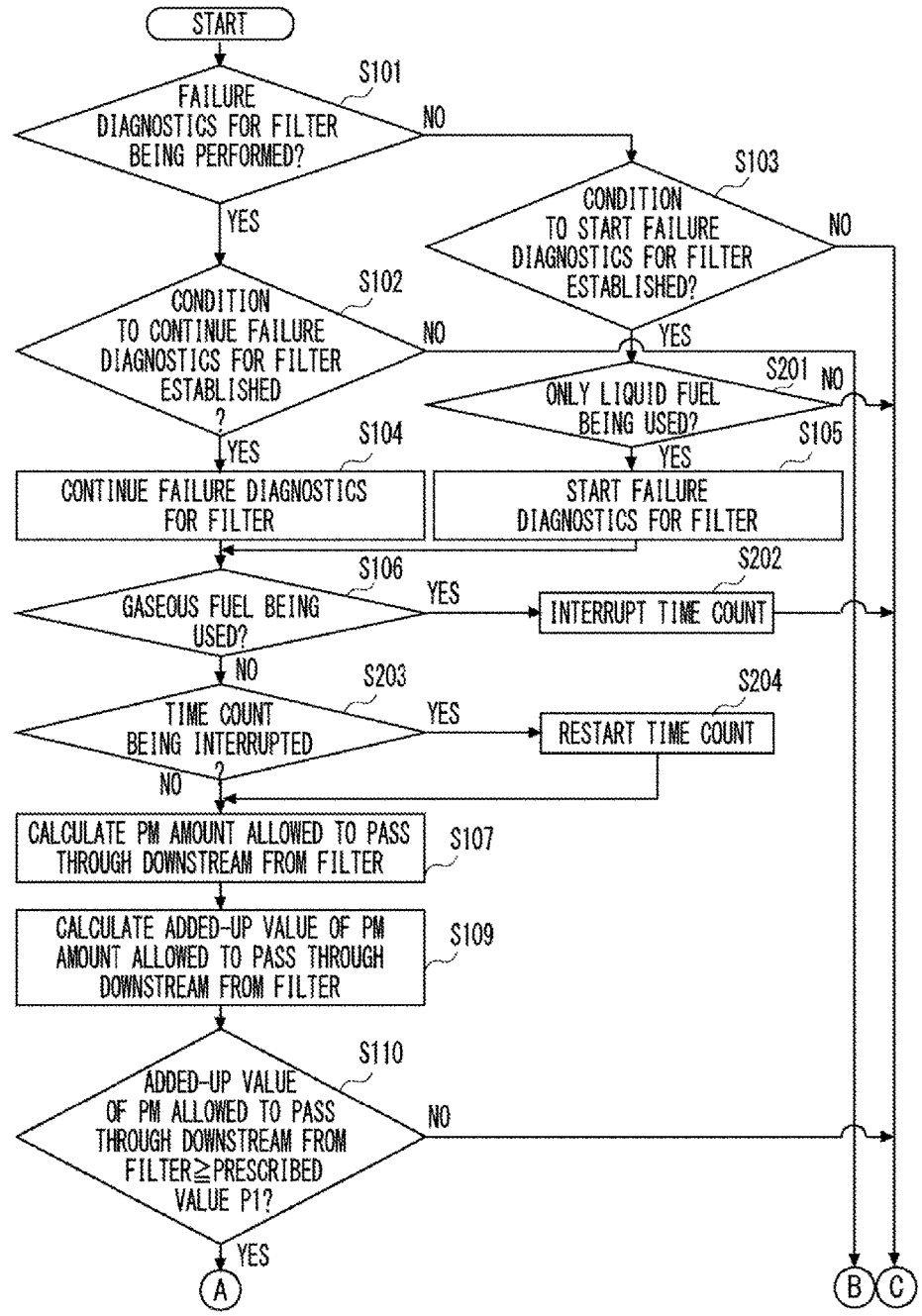

[Fig. 6B]
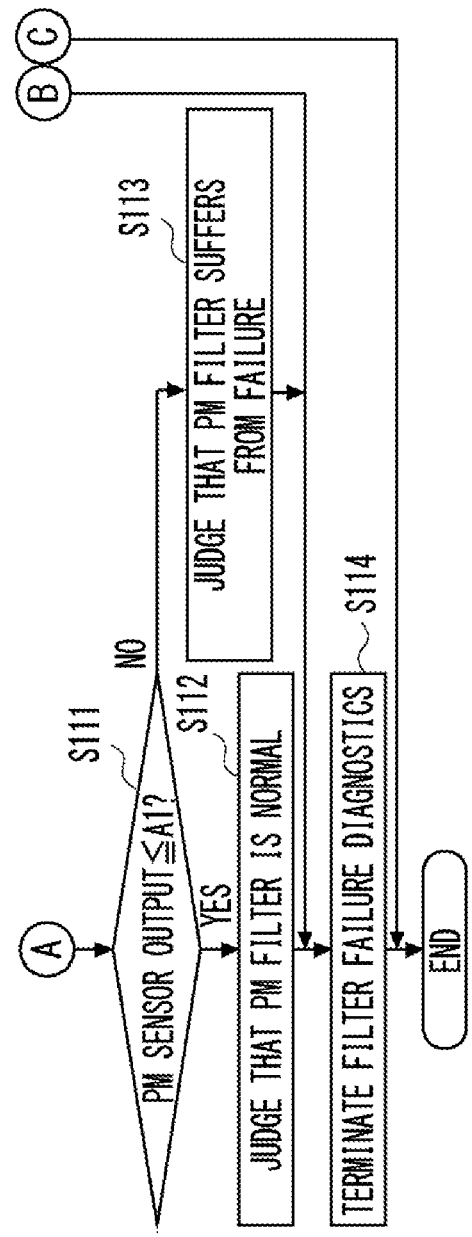

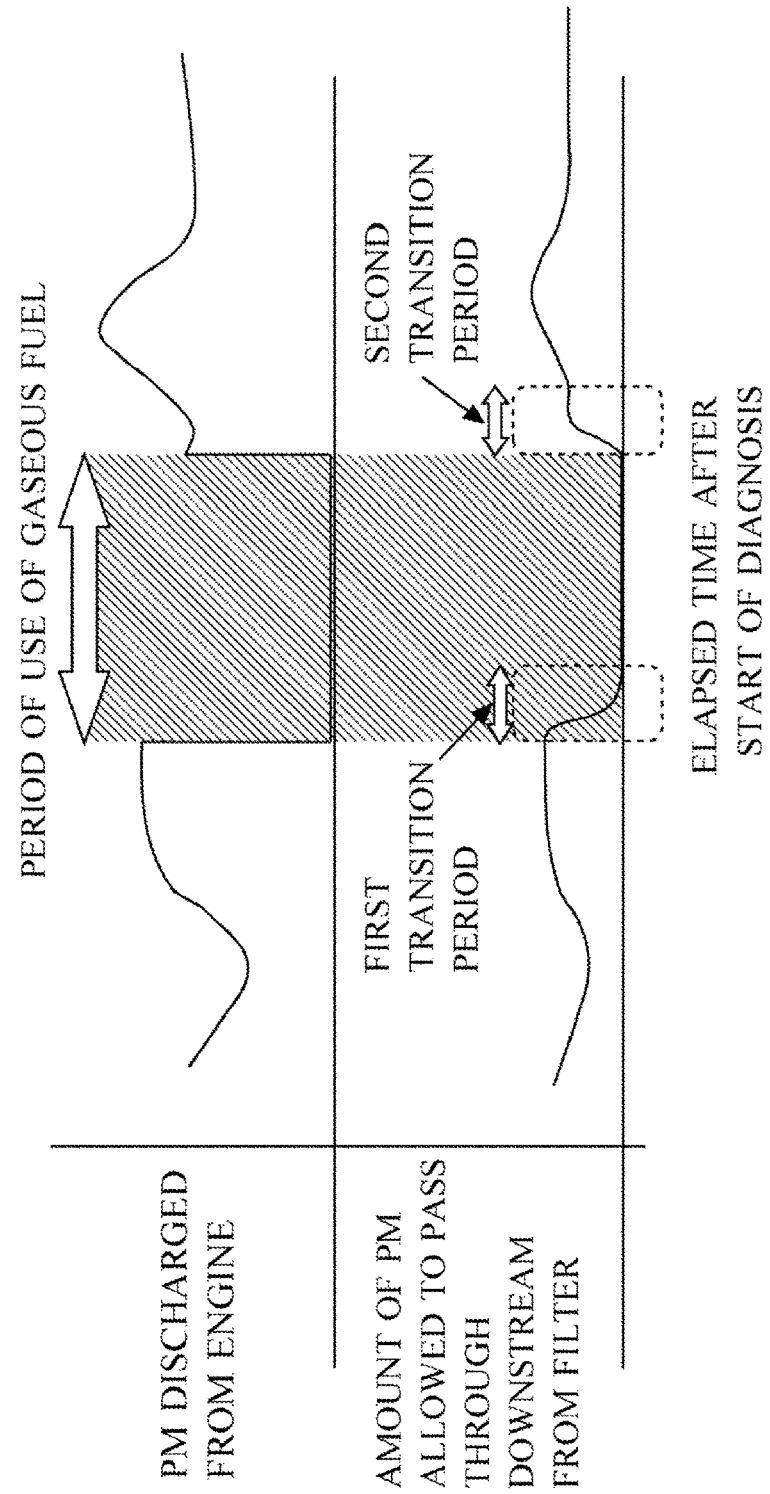
[Fig. 7]

[Fig. 8A]
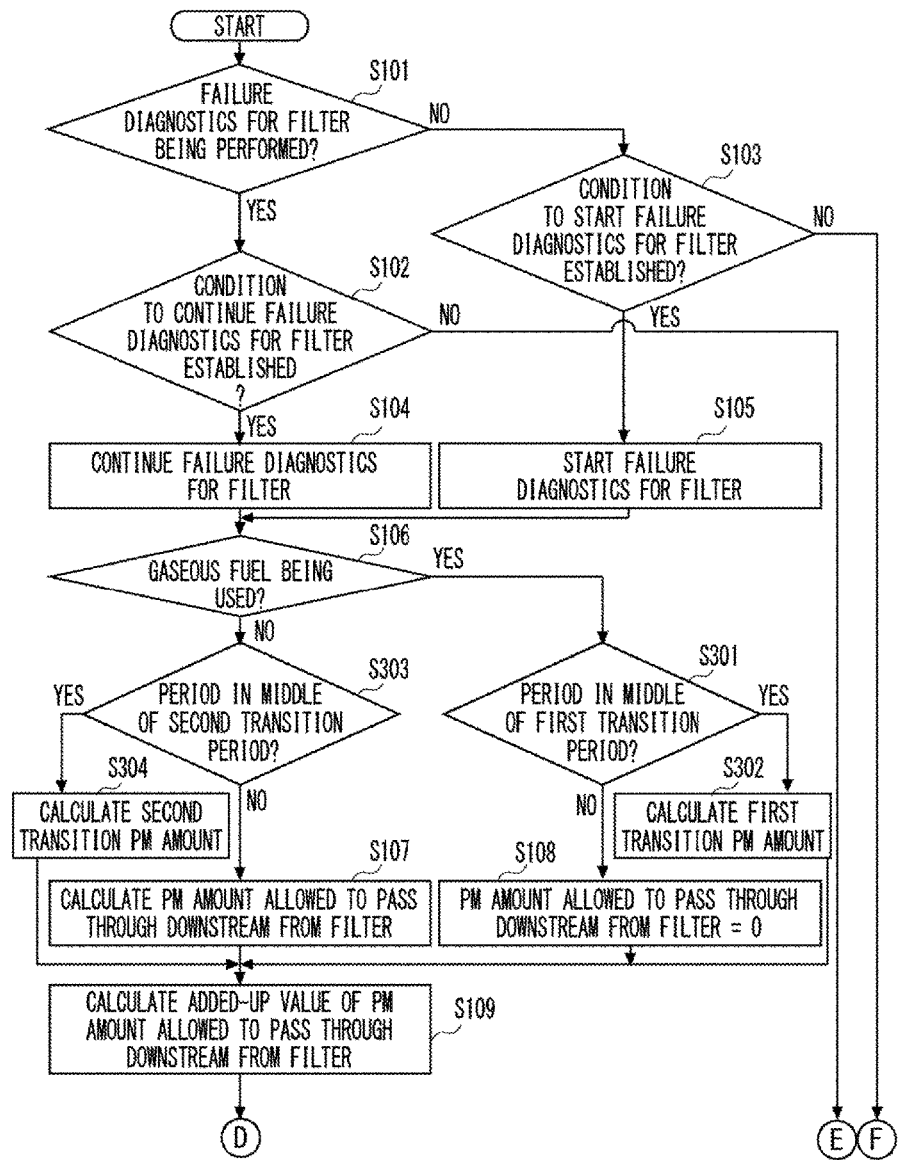

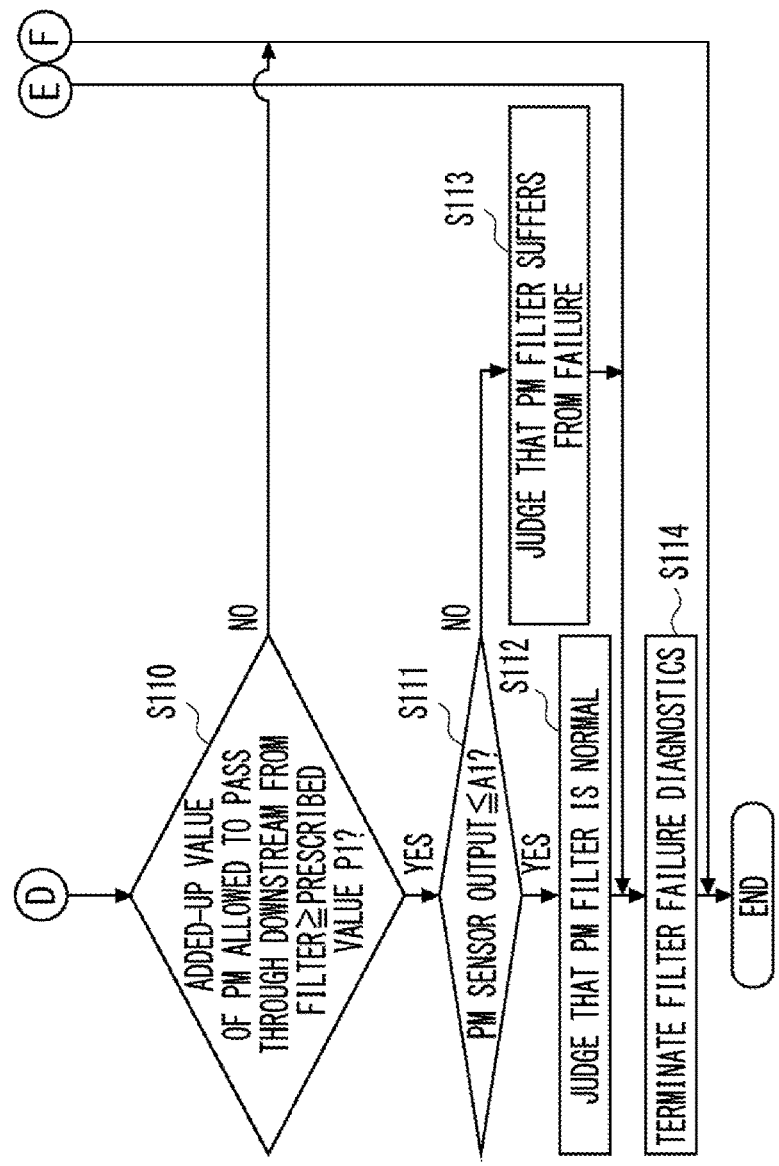
[Fig. 8B]

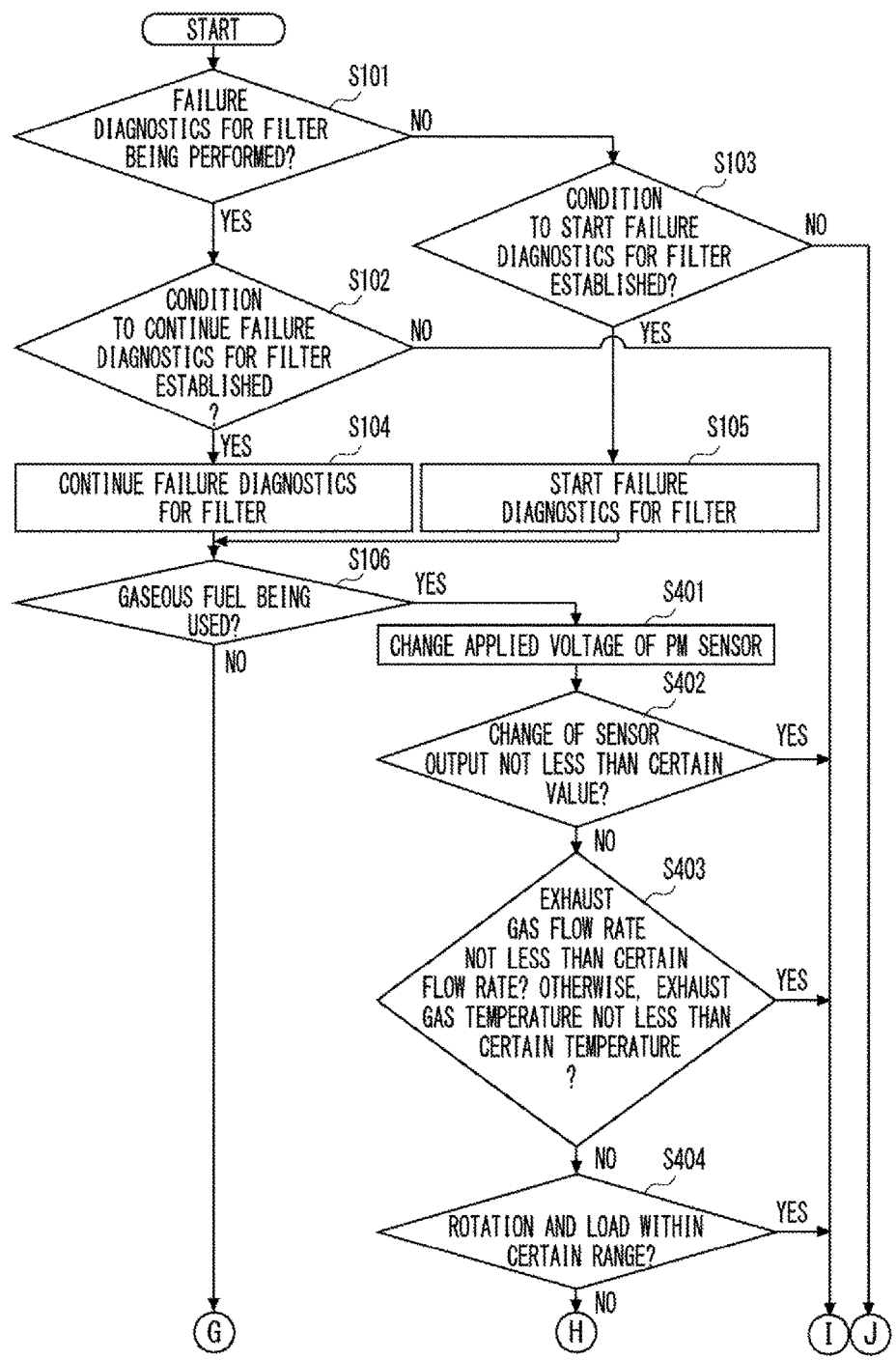
[Fig. 9A]

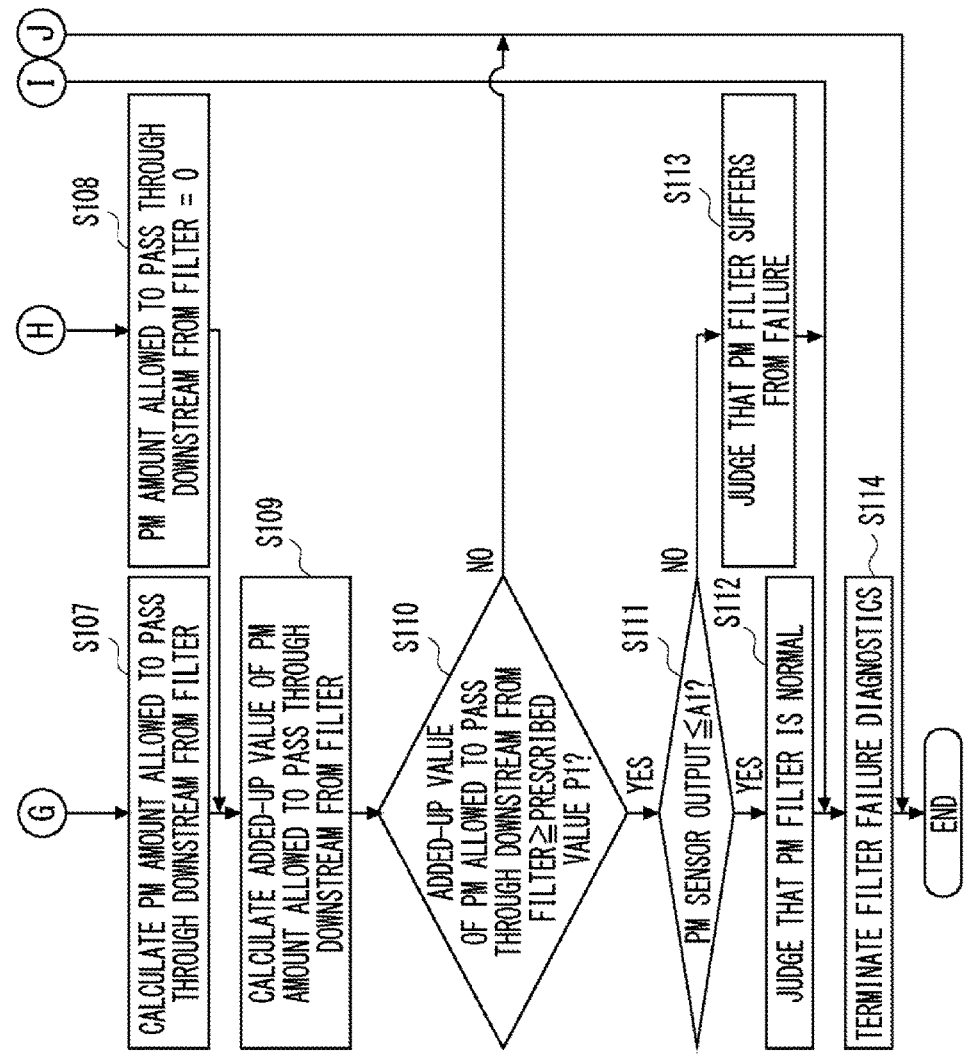
[Fig. 9B]

[Fig. 10A]
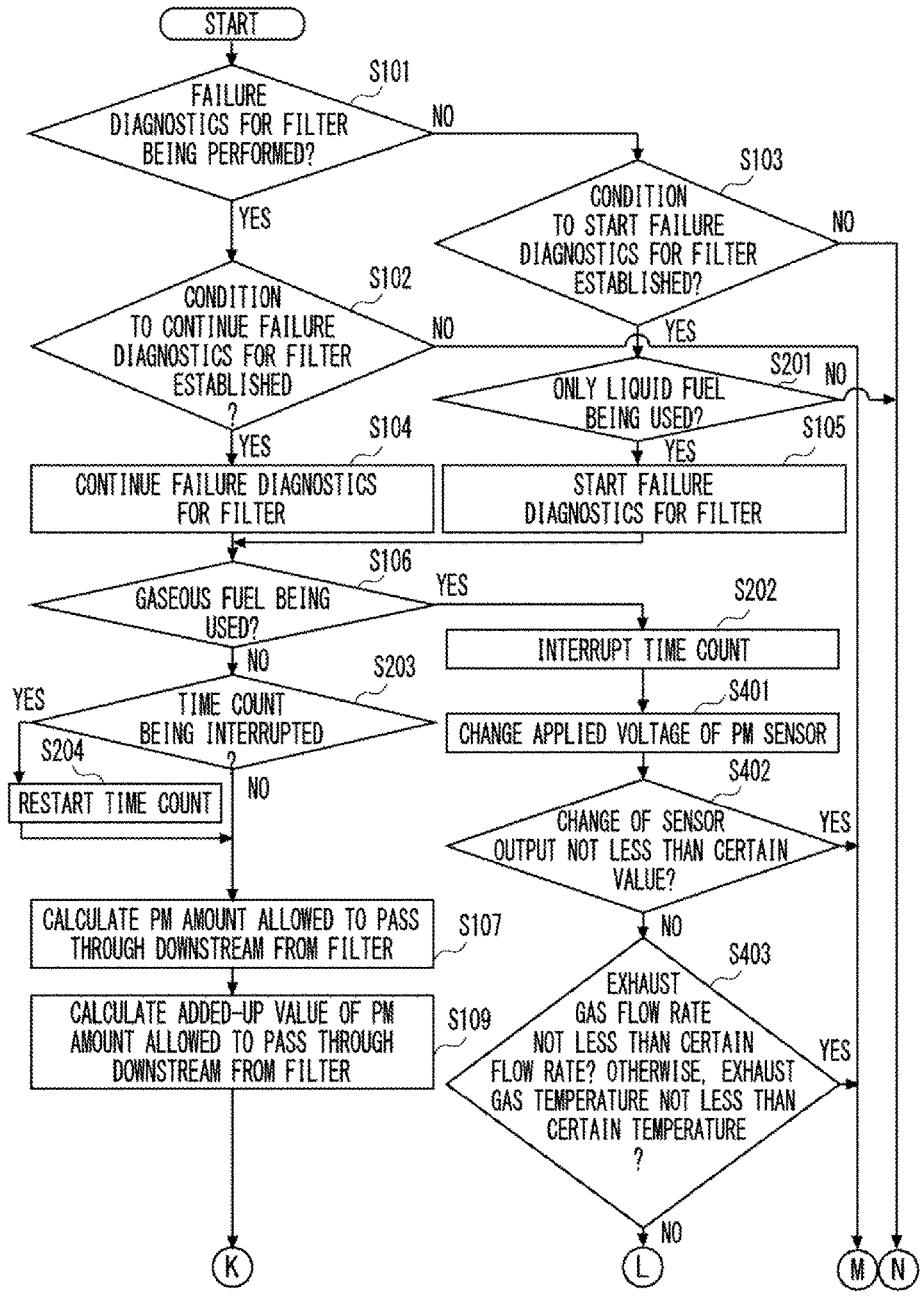

[Fig. 10B]
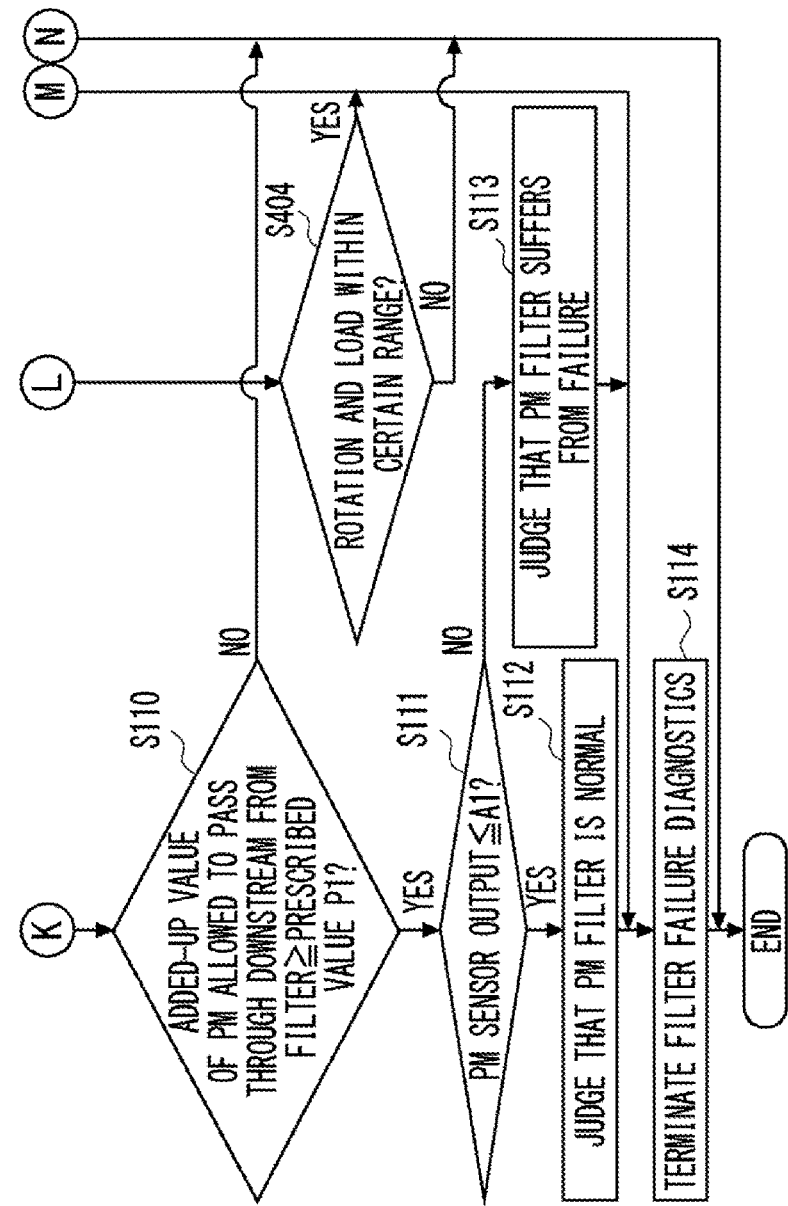

[Fig. 11A]
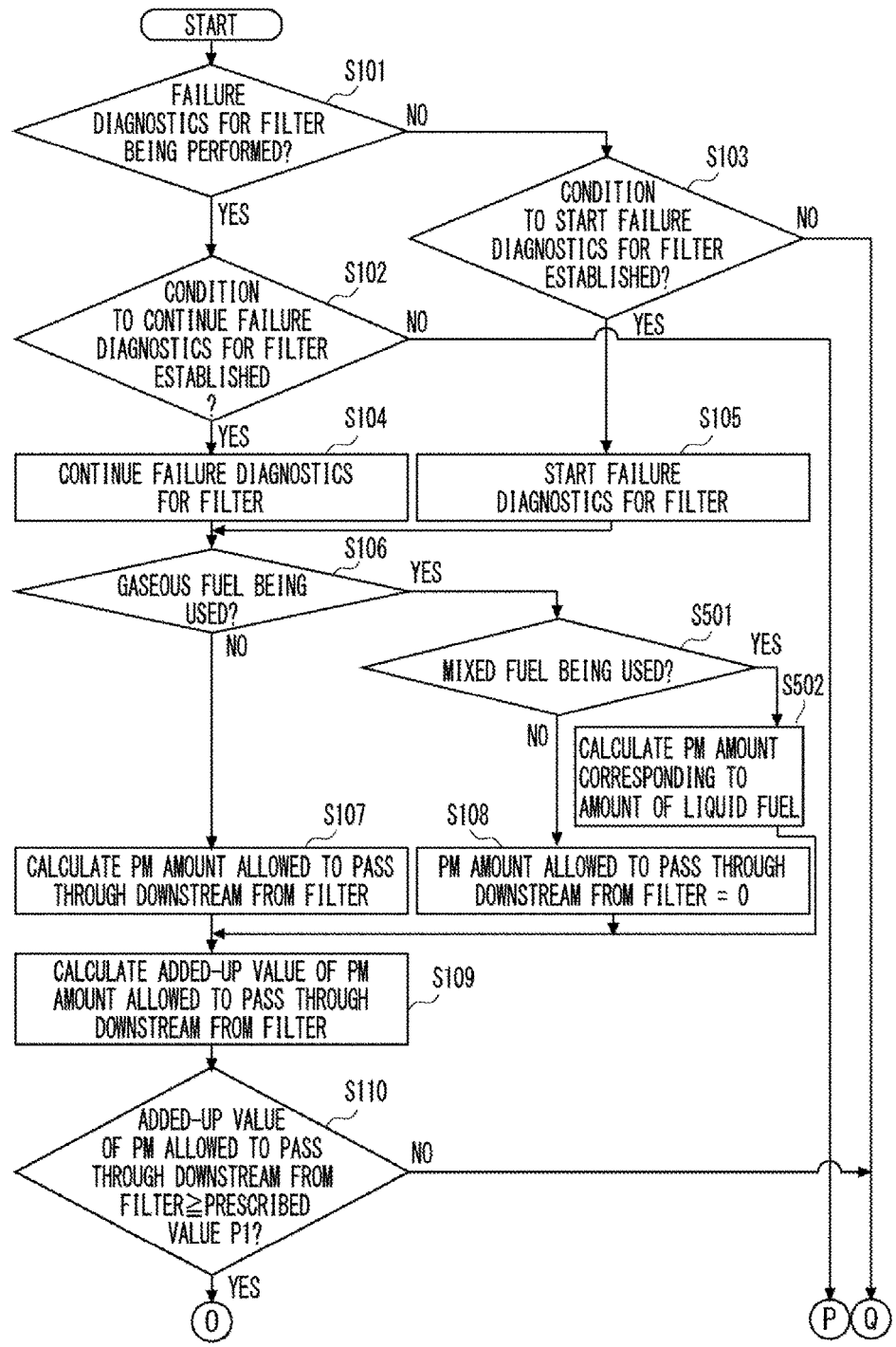

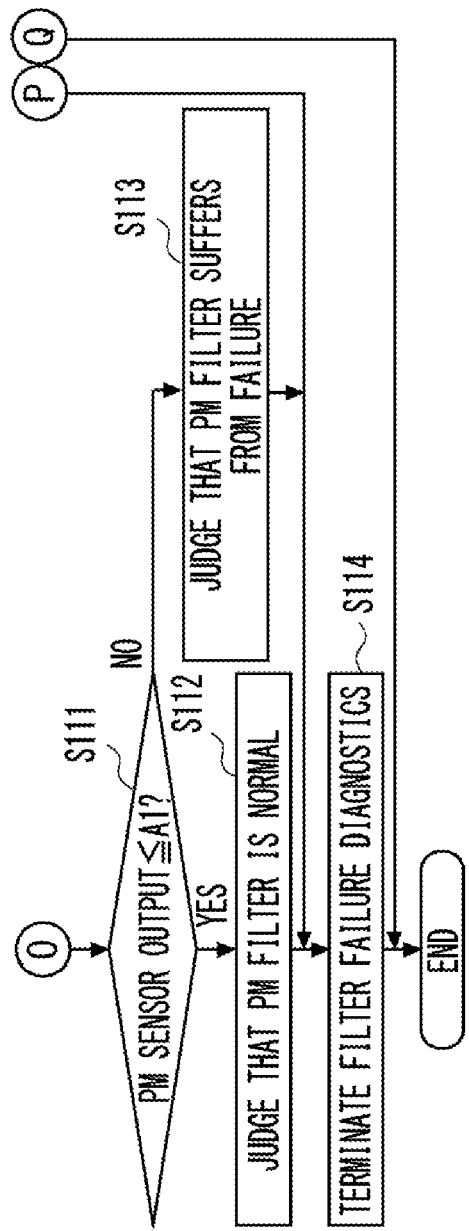
[Fig. 11B]

FILTER FAILURE DIAGNOSTIC DEVICE FOR AN INTERNAL COMBUSTION ENGINE

CROSS REFERENCE TO RELATED APPLICATIONS

This application is a National Stage of International Application No. PCT/JP2015/003445, filed on Jul. 8, 2015, which claims priority from Japanese Patent Application Nos. 2014-140936, filed on Jul. 8, 2014, and 2015-125153, filed on Jun. 22, 2015, the contents of all of which are incorporated herein by reference in their entirety.

TECHNICAL FIELD

The present invention relates to a filter failure diagnostic device for diagnosing any failure or trouble of a filter which collects particulate matter discharged from an internal combustion engine.

BACKGROUND ART

Conventionally, a filter is provided for an exhaust gas passage in some cases in order to purify particulate matter (PM) discharged from an internal combustion engine. As for the filter, the ability to collect the particulate matter can be regenerated by oxidizing and removing the particulate matter accumulated in the filter by raising the temperature. However, the filter suffers from any failure or trouble in some cases, for example, due to the appearance of chipping and/or breakage and/or due to the occurrence of erosion or dissolved loss caused by the excessive increase in temperature when the regeneration process is performed as described above.

When the filter suffers from the failure (filter is out of order), the following possibility arises. That is, the amount of the particulate matter, which passes through the filter without being collected by the filter, may be increased, and the amount of the particulate matter, which is released to the outside of a vehicle, may be increased. In relation thereto, in recent years, the following filter failure diagnostics is known as one of On-Board-Diagnostics (OBD) performed by a computer carried on a vehicle. That is, the differential pressure between the upstream and the downstream of the filter is detected, and it is judged that any failure occurs if the differential pressure is abnormally small. However, in the case of the filter failure diagnostics described above, for example, the following inconvenience arises. That is, the particulate matter, which is accumulated in the filter, is oxidized on account of the influence of, for example, the temperature and $NO_2$, the amount of accumulation of the particulate matter is changed, and it becomes difficult to grasp the abnormality of the filter by means of the differential pressure between the upstream and the downstream of the filter.

Another failure diagnostics, which utilizes a PM sensor for detecting the amount of particulate matter allowed to pass through a filter, has been suggested as another method for performing the failure diagnostics for the filter. The following technique is known in relation thereto. That is, those provided are a filter which is provided for an exhaust gas passage of an internal combustion engine and which collects particulate matter contained in an exhaust gas discharged from the internal combustion engine, and a PM sensor which is provided on a downstream side of the filter and which detects an amount of the particulate matter contained in the exhaust gas, wherein any failure of the filter is judged on the basis of the amount of the particulate matter which exists on the downstream from the filter and which is detected by the PM sensor. Further, in this procedure, the collection efficiency of the filter is taken into consideration (see, for example, Patent Document 1).

CITATION LIST

Patent Literature

[PTL 1]: Japanese patent laid-open publication No. 2007-315275

SUMMARY OF INVENTION

Technical Problem

In the failure diagnostics based on the use of the PM sensor as described above, the PM sensor, which is provided on the downstream side of the filter, is the sensor in which the output is generated at the point in time at which a predetermined amount of the particulate matter is accumulated. The output is generated earlier when the filter suffers from any failure as compared with when the filter is normal. This diagnostics resides in such a technique that the timing, at which the output of the PM sensor is generated, is estimated, and the failure of the filter is judged depending on the presence or absence of the output of the PM sensor provided at that timing.

However, in the case where the internal combustion engine as described above can use both of gaseous fuel and liquid fuel, it is assumed that the gaseous fuel is used in the middle of the execution of the failure diagnostics for the filter. The particulate matter is not discharged from the internal combustion engine when the gaseous fuel is used. Therefore, in such a situation, the amount of the particulate existing on the downstream side of the filter, which is detected by the PM sensor, is relatively decreased, and the timing, at which the output of the PM sensor is generated, is relatively delayed. As a result, it has been feared that the accuracy of the failure diagnostics for the filter may be lowered.

The present invention has been made taking the foregoing circumstances into consideration, an object of which is to provide a technique which makes it possible to perform the failure diagnostics for a filter more accurately even in the case of an internal combustion engine which is constructed to be capable of using both of gaseous fuel and liquid fuel.

Solution to Problem

In order to achieve the object as described above, the present invention provides a filter failure diagnostic device for performing a failure diagnostics for a filter of an internal combustion engine which can use gaseous fuel and liquid fuel, the feature of which resides in that any failure of the filter is judged on the basis of an added-up amount that is estimated in a predetermined period for particulate matter contained in an exhaust gas actually detected by a sensor and an added-up amount that is provided in the predetermined period for the particulate matter contained in the exhaust gas, and the added-up amount of the particulate matter contained in the exhaust gas is estimated on the basis of only a fuel injection amount of the liquid fuel when the added-up amount of the particulate matter contained in the exhaust gas is estimated, the fuel injection amount of the liquid fuel being selected from a fuel injection amount of the gaseous fuel and the fuel injection amount of the liquid fuel.

More specifically, there is provided a filter failure diagnostic device for an internal combustion engine for performing a failure diagnostics for a filter which collects particulate matter contained in an exhaust gas of the internal combustion engine capable of using gaseous fuel and liquid fuel; the filter failure diagnostic device for the internal combustion engine comprising a PM amount detecting sensor which is provided on a downstream side of the filter in an exhaust gas passage of the internal combustion engine and which detects an added-up amount of the particulate matter contained in the exhaust gas allowed to pass through a portion downstream from the filter; PM amount estimating means which estimates an added-up amount of the particulate matter contained in the exhaust gas allowed to pass through the portion downstream from the filter in the exhaust gas passage on the basis of a fuel injection amount and a predetermined parameter; and judging means which judges any failure of the filter in accordance with the added-up amount of the particulate matter contained in the exhaust gas allowed to pass through the portion downstream from the filter as detected by the PM amount detecting sensor during a predetermined period and the added-up amount of the particulate matter contained in the exhaust gas allowed to pass through the portion downstream from the filter as estimated by the PM amount estimating means during the predetermined period; wherein the PM amount estimating means estimates the added-up amount of the particulate matter contained in the exhaust gas allowed to pass through the portion downstream from the filter in the exhaust gas passage on the basis of the predetermined parameter and only a fuel injection amount of the liquid fuel out of a fuel injection amount of the gaseous fuel and the fuel injection amount of the liquid fuel.

In the failure diagnostics for the filter of the internal combustion engine according to the present invention, the PM amount detecting sensor is provided on the downstream side of the filter in the exhaust gas passage, and the added-up amount of the particulate matter contained in the exhaust gas allowed to pass through the portion downstream from the filter is detected in accordance with the output of the PM amount detecting sensor. Further, the added-up amount of the particulate matter contained in the exhaust gas is estimated by the PM amount estimating means on the basis of the fuel injection amount and the predetermined parameter. Then, the failure of the filter is judged in accordance with the added-up amount of the particulate matter contained in the exhaust gas as detected by the PM amount detecting sensor during the predetermined period and the added-up amount of the particulate matter contained in the exhaust gas as estimated by the PM amount estimating means during the predetermined period. This feature is based on the use of the fact that the amount of the particulate matter, which passes through the filter, is increased if the filter suffers from the failure (if the filter malfunctions or the filter is out of order).

On the other hand, the following fact is known in relation to the internal combustion engine which is capable of using both of the liquid fuel and the gaseous fuel. That is, the particulate matter is not produced basically by the internal combustion engine when the gaseous fuel is used. Therefore, if the fuel in use is switched from the fuel composed of only the liquid fuel to the fuel containing the gaseous fuel at least partially (hereinafter simply expressed as "liquid fuel is switched to gaseous fuel" as well) halfway through (in the middle of) the execution of the failure diagnostics for the filter of the internal combustion engine, then the particulate matter does not pass through the downstream side of the filter basically or the amount of the particulate matter allowed to pass through the downstream side of the filter is decreased during the period in which the gaseous fuel is used. Accordingly, the amount of the particulate matter detected by the PM amount detecting sensor is decreased during the period in which the gaseous fuel is used. Therefore, if the PM amount estimating means estimates the added-up amount of the particulate matter contained in the exhaust gas during the period in which the gaseous fuel is used, by means of the same method as that used for the period in which only the liquid fuel is used, the accuracy of the failure diagnostics for the filter is lowered in some cases.

In order to avoid the inconvenience as described above, in the present invention, the PM amount estimating means estimates the added-up amount of the particulate matter contained in the exhaust gas allowed to pass through the portion downstream from the filter in the exhaust gas passage on the basis of the predetermined parameter and only the fuel injection amount of the liquid fuel out of the fuel injection amount of the gaseous fuel and the fuel injection amount of the liquid fuel. Accordingly, the added-up amount of the particulate matter contained in the exhaust gas is estimated assuming that the fuel injection amount is zero because the injection amount of the liquid fuel is zero when the internal combustion engine uses only the gaseous fuel. Otherwise, the added-up amount of the particulate matter contained in the exhaust gas is estimated on the basis of the fuel injection amount of only the liquid fuel when the internal combustion engine uses any mixed fuel (blended fuel) composed of the gaseous fuel and the liquid fuel. Therefore, it is possible to estimate the added-up amount of the particulate matter contained in the exhaust gas, while considering the amount of decrease of the particulate matter caused by the use of the gaseous fuel. As a result, the decrease in the accuracy of the failure diagnostics for the filter can be suppressed, which would be otherwise caused by the use of the gaseous fuel during the failure diagnostics for the filter.

Note that in the present invention, the liquid fuel refers to the fuel in which the form of the fuel is liquid when the fuel is injected from a fuel injection valve. For example, gasoline and gas oil (light oil) correspond thereto. On the other hand, in the present invention, the gaseous fuel refers to the fuel in which the form of the fuel is gas when the fuel is injected from a fuel injection valve. For example, CNG (compressed natural gas) and hydrogen correspond thereto.

Further, in the present invention, the predetermined period may be a period provided from a point in time at which the PM amount estimating means starts the estimation of the added-up amount of the particulate matter allowed to pass through the exhaust gas passage on the downstream side of the filter until the added-up amount arrives at a prescribed value; and the judging means may judge that the filter suffers from the failure if the added-up amount of the particulate matter contained in the exhaust gas allowed to pass through the portion downstream from the filter, which is provided in the predetermined period and which is detected by the PM amount detecting sensor, is larger than a predetermined threshold value.

In this case, as described above, in the failure diagnostics for the filter of the internal combustion engine according to the present invention, the PM amount detecting sensor is provided on the downstream side of the filter in the exhaust gas passage, and the added-up amount of the particulate matter contained in the exhaust gas allowed to pass through the portion downstream from the filter during the period is detected in accordance with the output of the PM amount detecting sensor after the predetermined period elapses after the start of the failure diagnostics. Then, the failure of the filter is judged depending on whether or not the detection value obtained thereby is larger than the threshold value, for the following reason. That is, it is considered that if the filter suffers from the failure, then the amount of the particulate matter allowed to pass through the filter is increased, and the added-up amount of the particulate matter contained in the exhaust gas allowed to pass through the portion downstream from the filter is increased during the predetermined period.

Further, in the present invention, the PM amount estimating means is provided, which estimates the added-up amount of the particulate matter contained in the exhaust gas allowed to pass through the portion downstream from the filter in the exhaust gas passage on the basis of the fuel injection amount and the predetermined parameter. The PM amount estimating means starts the estimation of the added-up amount of the particulate matter allowed to pass through the exhaust gas passage disposed on the downstream side of the filter when the failure diagnostics for the filter is started. The predetermined period, which is referred to in the present invention, is the period provided from the point in time at which the estimation of the added-up amount of the particulate matter allowed to pass through the exhaust gas passage disposed on the downstream side of the filter is started by the PM amount estimating means until the added-up amount arrives at the prescribed value. The prescribed value may be the value of the added-up amount of the particulate matter at which the output of the PM amount detecting sensor begins to increase theoretically. Alternatively, the prescribed value may be the value of the added-up amount of the particulate matter at which the output of the PM amount detecting sensor has a proper value theoretically.

When the gaseous fuel is used in the circumstance as described above, then the particulate matter basically does not pass through the downstream side of the filter, or the amount of the particulate matter allowed to pass through the downstream side of the filter is decreased. Accordingly, when the predetermined period elapses, the amount of the particulate matter accumulated in the PM amount detecting sensor is decreased as compared with a case in which the gaseous fuel is not used. The result of comparison with the threshold value is not provided correctly, and the accuracy of the failure diagnostics for the filter is lowered in some cases.

In order to avoid the inconvenience as described above, in the present invention, the added-up amount of the particulate matter contained in the exhaust gas, which is based on only the liquid fuel, is estimated even when the internal combustion engine uses the gaseous fuel. Therefore, when the internal combustion engine uses only the gaseous fuel, the added-up amount of the particulate matter contained in the exhaust gas is estimated assuming that the fuel injection amount is zero. Further, when the internal combustion engine uses the mixed fuel of the gaseous fuel and the liquid fuel, the added-up amount of the particulate matter contained in the exhaust gas is estimated on the basis of the fuel injection amount of only the liquid fuel. Accordingly, it is possible to reduce the influence of the use of the gaseous fuel exerted on the added-up amount of the particulate matter allowed to pass through the exhaust gas passage disposed on the downstream side of the filter as estimated by the PM amount estimating means. As a result, it is possible to obtain the more correct predetermined period, and it is possible to suppress the decrease in the accuracy of the failure diagnostics for the filter.

Further, in the present invention, the device may further comprise transition period PM amount estimating means which estimates an added-up amount of the particulate matter allowed to pass through the exhaust gas passage on the downstream side of the filter in a transition period which appears when a ratio of the fuel injection amount of the liquid fuel with respect to the fuel injection amount of the gaseous fuel is switched and which is provided until change of an amount of the particulate matter allowed to pass through the exhaust gas passage on the downstream side of the filter is converged; wherein the added-up amount of the particulate matter contained in the exhaust gas allowed to pass through the portion downstream from the filter, which is provided in the predetermined period, may be estimated by estimating the added-up amount of the particulate matter estimated by the transition period PM amount estimating means in place of the added-up amount of the particulate matter estimated by the PM amount estimating means in the transition period, if the ratio of the fuel injection amount of the liquid fuel with respect to the fuel injection amount of the gaseous fuel is switched during the predetermined period.

In the present invention, when the ratio of the fuel injection amount of the liquid fuel with respect to the fuel injection amount of the gaseous fuel is switched during the predetermined period, the transitional phenomenon is taken into consideration, which appears, for example, immediately after the fuel in use is switched from the liquid fuel to the gaseous fuel, or immediately after the fuel in use is switched from the gaseous fuel to the liquid fuel. Accordingly, the accuracy of the failure diagnostics for the filter is improved.

A consideration is now made about the transition period provided immediately after the switching from a state in which all of the fuel in use of the internal combustion engine is the liquid fuel to a state in which all of the fuel in use of the internal combustion engine is the gaseous fuel. During the transition period, the particulate matter discharged from the internal combustion engine disappears. However, a part of the particulate matter, which adheres to the exhaust system including the filter of the internal combustion engine and the exhaust gas passage disposed upstream from the filter at that point in time, passes through the portion downstream from the filter. Then, the amount thereof is decreased as the time elapses, and the amount is approximately zero at the ending of the transition period.

Further, for example, a consideration is made about the transition period provided immediately after the switching from a state in which all of the fuel in use of the internal combustion engine is the gaseous fuel to a state in which all of the fuel in use of the internal combustion engine is the liquid fuel. It is affirmed that this transition period is the rising period provided until the particulate matter, which passes through the portion downstream from the filter, is increased from zero to the amount provided in the ordinary operation. That is, in this transition period, the particulate matter begins to be discharged from the internal combustion engine. However, the amount of the particulate matter, which adheres to the exhaust system including the exhaust gas passage and the filter, is relatively large at the initial stage. Therefore, the amount of the particulate matter, which passes through the portion downstream from the filter, is not increased immediately, but the amount is increased gradually. Then, the state returns at the end of the transition period to a state equivalent to a state in which the liquid fuel is used over a long period of time.

The foregoing explanation has been made in relation to the case in which the fuel in use is completely switched between the gaseous fuel and the liquid fuel. However, when the ratio of the fuel injection amount of the liquid fuel with respect to the fuel injection amount of the gaseous fuel is switched, the same or equivalent phenomenon basically appears to greater or lesser degrees.

In the present invention, the device comprises the transition period PM amount estimating means, which estimates the added-up amount of the particulate matter allowed to pass through the exhaust gas passage disposed on the downstream side of the filter in the transition period when the ratio of the fuel injection amount of the liquid fuel with respect to the fuel injection amount of the gaseous fuel is switched, in addition to the PM amount estimating means. Then, when the ratio of the fuel injection amount of the liquid fuel with respect to the fuel injection amount of the gaseous fuel is switched during the predetermined period, the added-up amount of the particulate matter, which is estimated by the transition period PM amount estimating means, is added up in the transition period, in place of the added-up amount of the particulate matter estimated by the PM amount estimating means. Then, the added-up amount of the particulate matter contained in the exhaust gas allowed to pass through the portion downstream from the filter, which is provided in the predetermined period, is estimated in accordance with the added-up amount of the particulate matter contained in the exhaust gas allowed to pass through the portion downstream from the filter as estimated by the PM amount estimating means in the period other than the transition period during the predetermined period and the added-up amount as estimated by the transition period PM amount estimating means in the transition period.

Accordingly, the added-up amount of the particulate matter allowed to pass through the exhaust gas passage disposed on the downstream side of the filter can be estimated in consideration of the transition phenomenon which appears when the ratio of the fuel injection amount of the liquid fuel with respect to the fuel injection amount of the gaseous fuel is switched. As a result, it is possible to determine the predetermined period more accurately, and it is possible to further raise the accuracy of the failure diagnostics for the filter.

Further, in the present invention, the failure diagnostics for the filter may be started during a period in which the internal combustion engine uses only the liquid fuel; and if the internal combustion engine is switched halfway through the failure diagnostics for the filter from a state in which the internal combustion engine uses only the liquid fuel to a state in which the internal combustion engine uses only the gaseous fuel, then the failure diagnostics for the filter may be interrupted during a period in which the internal combustion engine uses only the gaseous fuel, and the failure diagnostics for the filter may be restarted from a state of the interruption when the internal combustion engine subsequently starts use of only the liquid fuel.

Accordingly, the process of the failure diagnostics for the filter, which is performed until the gaseous fuel is used, is not useless during the failure diagnostics for the filter. The failure diagnostics for the filter can be completed after the internal combustion engine subsequently switches the fuel in use to the liquid fuel.

Note that in the present invention, the phrase "failure diagnostics for the filter is started" includes the start of the time count which serves as the reference or basis in the failure diagnostics, the estimation of the added-up amount of the particulate matter allowed to pass through the exhaust gas passage disposed on the downstream side of the filter as performed by the PM amount estimating means, and the detection of the added-up amount of the particulate matter contained in the exhaust gas allowed to pass through the portion downstream from the filter as performed by the PM amount detecting sensor. On the other hand, in the present invention, the phrase "failure diagnostics for the filter is interrupted" may include the interruption of the time count and the estimation of the added-up amount of the particulate matter allowed to pass through the exhaust gas passage disposed on the downstream side of the filter as performed by the PM amount estimating means.

Further, in the present invention, the PM amount detecting sensor may be capable of electrostatically collecting the particulate matter by being applied with a voltage; an electrostatic collecting force of the PM amount detecting sensor for collecting the particulate matter may be more increased as the applied voltage is more increased; the failure diagnostics for the filter may be started during a period in which the internal combustion engine uses only the liquid fuel; and the applied voltage applied to the PM amount detecting sensor may be raised during a period in which the internal combustion engine uses only the gaseous fuel, if the internal combustion engine is switched halfway through the failure diagnostics for the filter from a state in which the internal combustion engine uses only the liquid fuel to a state in which the internal combustion engine uses only the gaseous fuel. Accordingly, it is possible to increase the electrostatic collecting force brought about by the electrodes of the PM amount detecting sensor for collecting the particulate matter during the period in which the internal combustion engine uses the gaseous fuel. It is possible to suppress the particulate matter from being exfoliated or peeled off from the PM amount detecting sensor. As a result, it is possible to suppress the occurrence of any change of the added-up amount of the particulate matter as detected by the PM amount detecting sensor during the period in which the internal combustion engine uses only the gaseous fuel and the particulate matter is not newly collected by the PM amount detecting sensor on account of the formation of such a state that the particulate matter does not pass through the downstream side of the filter.

Further, in the present invention, the failure diagnostics for the filter may be started during a period in which the internal combustion engine uses only the liquid fuel; and the failure diagnostics for the filter may be terminated halfway if an output signal of the PM amount detecting sensor is changed by not less than a predetermined amount during a period in which the internal combustion engine uses only the gaseous fuel, when the internal combustion engine is switched halfway through the failure diagnostics for the filter from a state in which the internal combustion engine uses only the liquid fuel to a state in which the internal combustion engine uses only the gaseous fuel. Accordingly, it is possible to avoid such a situation that the failure diagnostics for the filter is performed as it is on the basis of the output of the PM amount detecting sensor, although the added-up amount of the particulate matter detected by the PM amount detecting sensor is changed during the period in which the internal combustion engine uses only the gaseous fuel and the particulate matter is not newly collected by the PM amount detecting sensor on account of the formation of such a state that the particulate matter does not pass through the downstream side of the filter.

As a result, it is possible to improve the accuracy of the failure diagnostics for the filter. In this case, the output signal of the PM amount detecting sensor is changed by not less than the predetermined amount during the period in which the internal combustion engine uses the gaseous fuel and the particulate matter is not newly collected by the PM amount detecting sensor, the cause of which can be exemplified, for example, by any dust or any foreign matter coming flying from the upstream side of the PM amount detecting sensor to adhere to the PM amount detecting sensor, and the exfoliation of the particulate matter accumulated on the PM amount detecting sensor.

Further, in the present invention, the failure diagnostics for the filter may be started during a period in which the internal combustion engine uses only the liquid fuel; and the failure diagnostics for the filter may be terminated halfway if an exhaust gas temperature of the internal combustion engine is not less than a predetermined temperature or an exhaust gas flow rate of the internal combustion engine is not less than a predetermined flow rate during a period in which the internal combustion engine uses only the gaseous fuel, when the internal combustion engine is switched halfway through the failure diagnostics for the filter from a state in which the internal combustion engine uses only the liquid fuel to a state in which the internal combustion engine uses only the gaseous fuel. In this case, the term "predetermined temperature" is the exhaust gas temperature as the threshold value at which it is considered that the particulate matter accumulated on the PM amount detecting sensor may be highly possibly oxidized and removed if the exhaust gas temperature of the internal combustion engine is not less than the predetermined temperature.

Further, the term "predetermined flow rate" is the exhaust gas flow rate as the threshold value at which it is considered that PM accumulated on the PM amount detecting sensor may be highly possibly exfoliated or peeled off if the exhaust gas flow rate is not less than the predetermined flow rate. That is, if the exhaust gas temperature of the internal combustion engine is not less than the predetermined temperature, the particulate matter accumulated on the PM amount detecting sensor may be highly possibly oxidized and removed. Further, if the exhaust gas flow rate of the internal combustion engine is not less than the predetermined flow rate, PM accumulated on the PM amount detecting sensor may be highly possibly exfoliated or peeled off.

Therefore, when the internal combustion engine is switched halfway through the failure diagnostics for the filter from the state in which the internal combustion engine uses only the liquid fuel to the state in which the internal combustion engine uses only the gaseous fuel, if the exhaust gas temperature of the internal combustion engine is not less than the predetermined temperature or the exhaust gas flow rate of the internal combustion engine is not less than the predetermined flow rate during the period in which the internal combustion engine uses only the gaseous fuel, then the failure diagnostics for the filter is terminated halfway. Accordingly, it is possible to avoid such a situation that the failure diagnostics for the filter is performed as it is on the basis of the output of the PM amount detecting sensor, although the added-up amount of the particulate matter detected by the PM amount detecting sensor is changed during the period in which the internal combustion engine uses only the gaseous fuel and the particulate matter is not newly collected by the PM amount detecting sensor on account of the formation of such a state that the particulate matter does not pass through the downstream side of the filter. As a result, it is possible to improve the accuracy of the failure diagnostics for the filter.

Further, in the present invention, the failure diagnostics for the filter may be started during a period in which the internal combustion engine uses only the liquid fuel; and the failure diagnostics for the filter may be terminated halfway if an operation state of the internal combustion engine belongs to a predetermined operation state included in a range of a rotation speed and a load in which it is feared that the particulate matter may be produced even when the internal combustion engine uses the gaseous fuel during a period in which the internal combustion engine uses only the gaseous fuel, when the internal combustion engine is switched halfway through the failure diagnostics for the filter from a state in which the internal combustion engine uses only the liquid fuel to a state in which the internal combustion engine uses only the gaseous fuel.

In this case, even when the internal combustion engine uses the gaseous fuel, it is feared that PM may be discharged from the internal combustion engine depending on the engine rotation speed and the engine load. In such a situation, the particulate matter is accumulated on the PM amount detecting sensor in spite of the continuation of the period in which the internal combustion engine uses only the gaseous fuel and the particulate matter is not newly collected by the PM amount detecting sensor. Therefore, the added-up amount of the particulate matter on the PM amount detecting sensor is changed. If the failure diagnostics for the filter is performed as it is on the basis of the output of the PM amount detecting sensor in spite of the fact as described above, the accuracy of the failure diagnostics for the filter is lowered.

On the contrary, in the present invention, the failure diagnostics for the filter is terminated halfway if the operation state of the internal combustion engine belongs to the predetermined operation state included in the range of the rotation speed and the load in which it is feared that the particulate matter may be produced even when the internal combustion engine uses the gaseous fuel during the period in which the internal combustion engine uses only the gaseous fuel by having the internal combustion engine switched from the state in which the internal combustion engine uses only the liquid fuel to the state in which the internal combustion engine uses only the gaseous fuel. Accordingly, it is possible to avoid such a situation that the failure diagnostics for the filter is performed as it is on the basis of the output of the PM amount detecting sensor after the internal combustion engine starts the use of only the liquid fuel although the added-up amount of the particulate matter detected by the PM amount detecting sensor has been changed during the period in which the internal combustion engine uses only the gaseous fuel and the particulate matter should not be newly collected by the PM amount detecting sensor on account of the formation of such a state that the particulate matter does not pass through the downstream side of the filter. As a result, it is possible to improve the accuracy of the failure diagnostics for the filter.

Further, in the present invention, the failure diagnostics for the filter may be started during a period in which the internal combustion engine uses only the liquid fuel; and the failure diagnostics for the filter may be terminated halfway if the internal combustion engine uses the gaseous fuel halfway through the failure diagnostics for the filter. Accordingly, the failure diagnostics for the filter can be performed in the state in which only the liquid fuel is used. As a result, such a situation can be provided that the failure diagnostics for the filter itself is not performed, if it is feared that the accuracy of the failure diagnostics may be lowered on account of the formation of the state in which the particulate matter does not pass through the downstream side of the filter or the amount of the particulate matter allowed to pass through the downstream side of the filter is decreased.

Accordingly, it is possible to suppress the decrease in the accuracy of the failure diagnostics itself for the filter.

Note that the means for solving the task of the present invention can be combined and used as far as possible.

Advantageous Effects of Invention

According to the present invention, it is possible to perform the failure diagnostics for the filter more accurately even in the case of the internal combustion engine which is constructed to be capable of using both of the gaseous fuel and the liquid fuel.

BRIEF DESCRIPTION OF DRAWINGS

FIG. 1 shows a schematic arrangement of an internal combustion engine according to an embodiment of the present invention, and an intake/exhaust system, a fuel supply system, and a control system thereof.

FIG. 2 illustrates the control of the failure diagnostics for the filter according to the embodiment of the present invention.

FIG. 3 illustrates the influence exerted when the fuel in use is switched from liquid fuel to gaseous fuel halfway through the failure diagnostics for the filter according to the embodiment of the present invention.

FIG. 4 shows a flow chart concerning a filter failure diagnostic routine according to a first embodiment of the present invention.

FIG. 5 shows a flow chart concerning a filter failure diagnostic routine 2 according to a second embodiment of the present invention.

FIG. 6A shows a flow chart concerning a filter failure diagnostic routine 3 according to a third embodiment of the present invention.

FIG. 6B shows a flow chart concerning a filter failure diagnostic routine 3 according to a third embodiment of the present invention.

FIG. 7 illustrates a first transition period and a second transition period in a fourth embodiment of the present invention.

FIG. 8A shows a flow chart concerning a filter failure diagnostic routine 4 according to a fourth embodiment of the present invention.

FIG. 8B shows a flow chart concerning a filter failure diagnostic routine 4 according to a fourth embodiment of the present invention.

FIG. 9A shows a flow chart concerning a filter failure diagnostic routine 5 according to a fifth embodiment of the present invention.

FIG. 9B shows a flow chart concerning a filter failure diagnostic routine 5 according to a fifth embodiment of the present invention.

FIG. 10A shows a flow chart concerning a filter failure diagnostic routine 6 according to a sixth embodiment of the present invention.

FIG. 10B shows a flow chart concerning a filter failure diagnostic routine 6 according to a sixth embodiment of the present invention.

FIG. 11A shows a flow chart concerning a filter failure diagnostic routine 7 according to a seventh embodiment of the present invention.

FIG. 11B shows a flow chart concerning a filter failure diagnostic routine 7 according to a seventh embodiment of the present invention.

DESCRIPTION OF EMBODIMENTS

The best mode for carrying out the present invention will be explained in detail below by way of example with reference to the drawings.

Embodiment 1

FIG. 1 shows a schematic arrangement of an internal combustion engine 1 according to this embodiment, and an intake/exhaust system, a fuel supply system, and a control system thereof. Note that the schematic arrangement of the internal combustion engine and the intake/exhaust system, the fuel supply system, and the control system is common to that of this embodiment in all of the following embodiments, unless specifically noted. The internal combustion engine 1 acquires the output by repeating the four strokes of the intake stroke, the compression stroke, the explosion stroke (expansion stroke), and the exhaust stroke. The internal combustion engine 1 has a cylinder (combustion chamber) 2 provided therein. The explosion force of the fuel, which is generated in the cylinder 2, is converted into the rotational force of a crank shaft (not shown) by the aid of a piston 3 and a connecting rod 4.

The cylinder 2 is provided with an intake port 11 which forms the most downstream portion of an intake pipe (suction pipe) 5 and an exhaust port 8 which forms the most upstream portion of an exhaust pipe 6. The boundary between the intake port 11 and the cylinder 2 is opened/closed by an intake valve 12. Further, the boundary between the exhaust port 8 and the cylinder 2 is opened/closed by an exhaust valve 9. Further, a spark plug (ignition plug) 15 for igniting the fuel supplied into the cylinder 2 is provided in the cylinder 2 of the internal combustion engine 1.

The intake pipe 5 is provided with an air flow meter 13 which detects the amount of the introduced intake gas (intake air amount), a throttle valve 14 which is capable of controlling the amount of the intake gas, and a surge tank 16 which is the tank for removing any pulsation of the intake gas.

Note that the internal combustion engine 1 is capable of using, as the fuel, CNG as gaseous fuel and gasoline as liquid fuel, and the internal combustion engine 1 is provided with a CNG supply device 17 and a gasoline supply device 18. The CNG supply device 17 is provided with a CNG injection valve 17a which is arranged at the intake port 11. The CNG injection valve 17a is connected to a CNG bomb 17c via a CNG supply tube 17b. An unillustrated fuel shutoff valve and a regulator are arranged in the CNG supply tube 17b.

Similarly, the gasoline supply device 18 is provided with a gasoline injection valve 18a which is arranged at the intake port 11. The gasoline injection valve 18a is connected to a gasoline tank 18c via a gasoline supply tube 18b. Note that an unillustrated fuel pump is arranged in the gasoline supply tube 18b. A CNG amount sensor 40, which generates an output voltage proportional to the remaining CNG amount in the CNG bomb 17c, is arranged for the CNG supply tube 17b. A gasoline amount sensor 41, which generates an output voltage proportional to the remaining gasoline amount in the gasoline tank 18c, is arranged for the gasoline tank 18c.

Further, the exhaust pipe 6 is provided with a filter 10 which collects particulate matter (hereinafter referred to as "PM" as well) contained in the exhaust gas. Note that the filter 10 may have the function to merely collect PM contained in the exhaust gas. Alternatively, for example, the filter 10 may be carried with any catalyst for the purpose of exhaust gas purification, including, for example, DPNR which has the function of a storage reduction NOx catalyst in combination and SCRF which has the function as a selective catalytic reduction catalyst in combination.

An exhaust gas temperature sensor 24, which detects the temperature of the exhaust gas discharged from the filter 10, is provided on the downstream side of the filter 10. Further, a PM sensor 25, which serves as the PM amount detecting sensor for detecting PM allowed to pass through the filter 10, is provided on the downstream side of the exhaust gas temperature sensor 24.

The structure of the PM sensor 25 will now be explained. The PM sensor 25 is a PM sensor of the electrode type, and the PM sensor 25 is constructed in such a form that at least a pair of electrodes are provided in a sensor element included in the PM sensor 25. Only one pair of electrodes may be provided for the sensor element, or a plurality of electrodes may be provided therefor. For example, it is also allowable to provide a so-called comb-shaped electrode in which a plurality of electrodes are aligned. The PM sensor 25 is used such that a voltage is applied between the electrodes of the sensor element.

PM contained in the exhaust gas adheres between the electrodes of the sensor element of the PM sensor 25. PM is composed of carbon particles, and PM has the conductivity. Therefore, when the amount of adhesion of PM is increased, the current flows between the electrodes (electric conduction occurs). The value of the current is the value corresponding to the amount of adhesion of PM, i.e., the value corresponding to the amount of PM contained in the exhaust gas. Therefore, when the current value provided at a predetermined timing (or the resistance value between the electrodes correlated with the current value) is read, it is thereby possible to detect the amount of PM allowed to leak out from the filter 10.

Note that in relation to the PM sensor 25, the sensor regeneration control is executed to remove PM accumulated between the electrodes of the sensor element of the PM sensor 25 (hereinafter referred to as "electrodes of the PM sensor" as well for the purpose of simplification). In the sensor regeneration control, when PM of not less than a predetermined amount is accumulated between the electrodes of the PM sensor 25, then the portion between the electrodes is heated to about 650° C. to 800° C. by means of a heater (not shown) to oxidize and remove accumulated PM, and thus the ability to detect PM is regenerated. The state is returned to a state in which PM is absent between the electrodes of the PM sensor 25 by performing the sensor regeneration control. Therefore, the output of the PM sensor 25 is also lowered to approximately zero.

The internal combustion engine 1 is provided in combination with an electronic control unit (ECU) 20 in order to control the internal combustion engine 1 and the intake/exhaust system thereof and the fuel supply system thereof. ECU 20 is the unit which controls, for example, the operation state of the internal combustion engine 1 in accordance with the operation condition of the internal combustion engine 1 and/or the request of the driver, and ECU 20 is the unit which performs the control concerning the exhaust system including the filter 10 in addition thereto. ECU 20 is provided with, for example, CPU, ROM, and RAM. ROM stores programs which are provided to perform various types of control in relation to the internal combustion engine 1 and the exhaust system thereof and maps in which data is stored.

The air flow meter 13 described above, the CNG amount sensor 40, the gasoline amount sensor 41, the exhaust gas temperature sensor 24, and the PM sensor 25 as well as a crank position sensor 21 for detecting the rotation speed of the engine of the internal combustion engine 1, an accelerator position sensor 22 and the like are electrically connected to ECU 20. Output signals of the sensors are inputted into ECU 20. On the other hand, the elements including, for example, the throttle valve 14, the ignition plug 15, the CNG injection valve 17a, and the gasoline injection valve 18a are electrically connected to ECU 20. The elements are controlled on the basis of output signals from ECU 20.

Next, an explanation will be made about On-Board-Diagnostics (OBD) performed for the internal combustion engine 1 according to this embodiment. With reference to FIG. 2, the horizontal axis represents the elapsed time after the start of the failure diagnostics for the filter 10 (hereinafter simply referred to as "failure diagnostics" as well), and the vertical axis represents the output of the PM sensor 25. With reference to FIG. 2, the timing, at which the failure diagnostics is started, is the point in time at which the temperature of the electrodes of the PM sensor 25 is cooled to such an extent that PM can be accumulated after the termination of the sensor regeneration control as described above. As indicated by a solid line in FIG. 2, in the case of a normal filter, the amount of PM itself, which passes through the filter 10, is small. Therefore, the amount of PM accumulated between the electrodes of the PM sensor 25 is small. Therefore, in the case of the normal filter, the time is long until the output of the PM sensor 25 begins to increase after the start of the failure diagnostics.

On the other hand, in the case of a troubled filter (failure filter) as shown by a dotted line in FIG. 2, the amount of PM, which is allowed to pass through the filter 10, is large as compared with the case of the normal filter. Therefore, PM is accumulated between the electrodes of the PM sensor 25 at relatively early times, and the current easily flows between the electrodes. Therefore, the output of the PM sensor 25 begins to increase at early times as compared with the case of the normal filter, and the output continues to increase as the time elapses. Therefore, for example, if the output of the PM sensor 25, which is provided at the point in time at which the elapsed time arrives at the judgment time T1 after the start of the failure diagnostics, is larger than a threshold value A1, it is possible to judge that the filter 10 suffers from any failure (filter is out of order). If the output of the PM sensor 25, which is provided at the point in time at which the elapsed time arrives at the judgment time T1 after the start of the failure diagnostics, is not more than the threshold value A1, it is possible to judge that the filter 10 is normal.

Note that after the start of the diagnosis, the PM amount allowed to pass through the portion downstream from the filter 10 and the added-up value thereof are estimated at each of the elapsed times on the basis of the fuel injection amount and the predetermined parameters including, for example, the operation state of the internal combustion engine 1, the exhaust gas flow rate, the assumed pass-through ratio of the filter 10, and the PM accumulation amount in the filter 10. Then, the time, which is required until the added-up value arrives at the amount at which the output of the PM sensor 25 begins to increase or the output of the PM sensor 25 has a preset value, is set as the judgment time T1. Then, as for the threshold value A1 for the failure judgment for the filter 10, the value, which is derived theoretically or by any experiment or any simulation, is set as the value with which it is possible to decide that the filter 10 suffers from the failure if the output of the PM sensor 25 at the judgment time T1 is not less than the value.

Next, an explanation will be made about a problem of the failure diagnostics for the filter 10 in relation to the internal combustion engine 1 which is capable of using a plurality of types of fuel of CNG which is the gaseous fuel and gasoline which is the liquid fuel.

FIG. 3 shows a graph in which the horizontal axis represents the elapsed time after the start of the failure diagnostics, and the vertical axis represents the amount of PM actually discharged from the internal combustion engine 1, the added-up value of the PM amount allowed to pass through the portion downstream from the filter 10 as calculated by ECU 20, and the output (output current) of the PM sensor 25. Note that in FIG. 3, it is premised that the failure diagnostics for the filter 10 is started during the period in which gasoline is used as the fuel for the internal combustion engine 1. The calculation of the added-up value of the PM amount allowed to pass through the portion downstream from the filter 10 by ECU 20 corresponds to the estimation of the added-up value of the PM amount allowed to pass through the portion downstream from the filter 10. This is the same as those referred to in the following embodiments as well.

At first, a consideration will now be made about a case in which only gasoline is used as the fuel during the process of the failure diagnostics for the filter 10. In this case, as shown by a solid line in FIG. 3, PM is continuously discharged from the internal combustion engine 1 depending on the operation state. Further, in ECU 20, the PM amount allowed to pass through the portion downstream from the filter 10 and the added-up value thereof are continuously calculated. Then, as explained with reference to FIG. 2, the output of the PM sensor 25 is detected at the judgment time T1 at which the added-up value of the PM amount allowed to pass through the portion downstream from the filter 10, which is calculated by ECU 20, becomes a prescribed value P1. Then, it is judged whether the filter 10 is normal or abnormal depending on whether the output of the PM sensor 25 is larger than the threshold value A1 or not more than A1. Note that in FIG. 3, the period, which ranges from the start of the failure diagnostics for the filter 10 to the judgment time T1, corresponds to the predetermined period.

Next, a consideration will be made about a case in which the fuel in use is switched from gasoline to CNG halfway through (in the middle of) the failure diagnostics for the filter 10 as indicated by hatched lines in FIG. 3. Note that in this embodiment, the phrase "fuel in use is switched from gasoline to CNG" means the fact that the state is transferred or changed over from the state in which only gasoline is used as the fuel to the state in which only CNG is used as the fuel. Unless specifically noted, this fact is the same as or equivalent to those referred to in the following embodiments as well. In this case, as shown by dotted lines in the upper part of FIG. 3, PM is not discharged basically from the internal combustion engine 1 during the period in which CNG is used. Accordingly, the PM amount, which is accumulated on the PM sensor 25, is not increased as well during the period in which CNG is used. As a result, as shown by a dotted line in the lower part of FIG. 3, the timing, at which the increase is observed in the output of the PM sensor 25, is delayed.

Therefore, when the fuel in use is switched from gasoline to CNG halfway through the failure diagnostics for the filter 10, if the failure diagnostics for the filter 10 is performed by using the same judgment time T1 and the same threshold value A1 as those used when only gasoline is used, then it is feared that the value of the output of the PM sensor 25 may be decreased, and the accuracy of the failure diagnostics for the filter 10 may be lowered.

On the contrary, in this embodiment, when the fuel in use is switched from gasoline to CNG during the process of the failure diagnostics for the filter 10, then the PM amount allowed to pass through the portion downstream from the filter 10 is zero, and the added-up value thereof is not increased in the calculation of the added-up value of the PM amount allowed to pass through the portion downstream from the filter 10. Then, when the fuel in use is subsequently switched from CNG to gasoline, the calculation of the PM amount allowed to pass through the portion downstream from the filter 10 and the added-up value thereof, which is to be ordinarily performed, is restarted.

Accordingly, as shown in the middle part of FIG. 3, the added-up value of the PM amount allowed to pass through the portion downstream from the filter 10 is not changed as well during the period in which CNG is used as the fuel and PM is not produced from the internal combustion engine 1. When the use of gasoline is restarted, and the production of PM by the internal combustion engine 1 is restarted, then the increase in the added-up value of the PM amount allowed to pass through the portion downstream from the filter 10 is also restarted. Therefore, the decrease in the accuracy of the failure diagnostics for the filter 10, which would be otherwise caused by the use of CNG as the fuel, can be suppressed.

FIG. 4 shows a flow chart of a filter failure diagnostic routine according to this embodiment. This routine is realized by the program stored in ROM of ECU 20, and the program is executed by ECU 20 during the operation of the internal combustion engine 1 every time when a predetermined time elapses. Note that in relation to the filter failure diagnostic routine of this embodiment, it is premised that the internal combustion engine 1 can select and use any one of the gaseous fuel and the liquid fuel, but the internal combustion engine 1 does not use any mixed fuel of the gaseous fuel and the liquid fuel.

When this routine is executed, at first, it is judged in S101 whether or not the failure diagnostics for the filter is being performed. Specifically, the value of a filter failure diagnostics flag which is to be turned ON when the failure diagnostics for the filter 10 is started is read, and the decision may be made depending on whether the value is 1 or 0. Alternatively, the decision may be made by detecting the state of the element used for the filter failure diagnostics, including, for example, the sensor element of the PM sensor 25. If it is decided in S101 that the failure diagnostics for the filter 10 is being performed, the routine proceeds to S102. On the other hand, if it is decided that the failure diagnostics for the filter 10 is not being performed, the routine proceeds to S103.

In S102, it is judged whether or not the condition to continue the failure diagnostics for the filter 10 is established. More specifically, it is judged whether or not the exhaust gas temperature sensor 24, the PM sensor 25 and the like are operated normally in addition to the air flow meter 13. If it is judged in this step that the condition to continue the failure diagnostics for the filter as described above is established, the routine proceeds to S104. On the other hand, if it is judged that the condition to continue the failure diagnostics for the filter is not established, the routine proceeds to S114.

In S103, it is judged whether or not the condition to start the failure diagnostics for the filter 10 is established. More specifically, it is judged whether or not the exhaust gas temperature sensor 24, the PM sensor 25 and the like are operated normally in addition to the air flow meter 13 in the same manner as in S102. Further, it is judged whether or not such a state is given that the sensor regeneration process for the PM sensor 25 is completed, and the temperature of the electrodes of the PM sensor 25 is lowered, for the following reason. That is, it is necessary that the failure diagnostics for the filter 10 should be started in such a state that PM is not accumulated between the electrodes of the PM sensor 25 and PM can be accumulated as described later on. If it is judged in this step that the condition to start the failure diagnostics for the filter as described above is established, the routine proceeds to S105. On the other hand, if it is judged that the condition to start the failure diagnostics for the filter is not established, this routine is once terminated as it is.

In S104, the failure diagnostics for the filter 10 is continued. In this step, the application of the voltage to the sensor element of the PM sensor 25 described later on and the measurement of the output are continued, the time measurement is continued, and the calculation of the PM amount allowed to pass through the portion downstream from the filter 10 is continued. If the process of S104 is terminated, the routine proceeds to S106.

Subsequently, in S105, the failure diagnostics for the filter 10 is started. Specifically, the application of the voltage to the sensor element of the PM sensor 25 and the measurement of the output are started, the time count is started, and the calculation of the PM amount allowed to pass through the portion downstream from the filter 10 is started. If the process of S105 is terminated, the routine proceeds to S106.

In S106, it is judged whether or not the gaseous fuel is being used. That is, it is judged in this step whether or not the fuel in use is CNG. If it is judged in this step that the fuel in use is not CNG but gasoline, the routine proceeds to S107. On the other hand, if it is judged that the fuel in use is CNG, the routine proceeds to S108.

In S107, the PM amount, which passes through the portion downstream from the filter 10 during the period ranging from the point in time at which the filter failure diagnostics routine was executed last time to the point in time at which the filter failure diagnostics routine is executed this time, is calculated by ECU 20. As for this value, the amount of PM, which passes through the portion downstream from the filter 10 during the period ranging from the point in time at which the filter failure diagnostics routine was executed last time to the point in time at which the filter failure diagnostics routine is executed this time, may be calculated on the basis of any known calculation formula (computation expression) by using at least one of parameters of the operation state of the internal combustion engine 1, the exhaust gas flow rate, the exhaust gas temperature, and the PM amount accumulated in the filter in addition to the assumed pass-through ratio of the filter.

Alternatively, the calculation may be substantially performed such that the value of the amount of PM allowed to pass through the portion downstream from the filter 10 corresponding to each of the parameters at that point in time may be read from a map which stores the relationship between at least one of the operation state of the internal combustion engine 1, the exhaust gas flow rate, the exhaust gas temperature, and the estimated value of the PM accumulation amount in the filter 10 in addition to the assumed pass-through ratio of the filter and the calculated value of the amount of PM allowed to pass through the portion downstream from the filter 10. Note that the assumed pass-through ratio of the filter 10 is herein the assumed value with which the filter 10 is to be regarded to suffer from the failure when the PM pass-through ratio of the filter 10 is not less than a certain extent, which is determined previously. The definition of the assumed pass-through ratio of the filter 10 is common to all of the descriptions of this specification. If the process of S107 is terminated, the routine proceeds to S109. Further, in this embodiment, at least one of the operation state of the internal combustion engine 1, the exhaust gas flow rate, the exhaust gas temperature, and the estimated value of the PM accumulation amount in the filter 10 in addition to the assumed pass-through ratio of the filter constitutes the predetermined parameter.

On the other hand, in S108, the value of the PM amount allowed to pass through the portion downstream from the filter 10 during the period ranging from the point in time at which the filter failure diagnostics routine was executed last time to the point in time at which the filter failure diagnostics routine is executed this time is set to zero. If the process of S108 is terminated, the routine proceeds to S109.

In S109, the added-up value of the PM amount allowed to pass through the portion downstream from the filter 10, which is provided after the start of the failure diagnostics for the filter 10 this time, is calculated. Specifically, the PM amount, which is obtained this time by the execution of S107 or S108 and which is allowed to pass through the portion downstream from the filter 10 during the period ranging from the point in time at which the filter failure diagnostics routine was executed last time to the point in time at which the filter failure diagnostics routine is executed this time, is added to the added-up value of the PM amount allowed to pass through the portion downstream from the filter 10 as calculated last time in S109. If the process of S109 is terminated, the routine proceeds to S110.

In S110, it is judged whether or not the added-up value of the PM amount allowed to pass through the portion downstream from the filter 10 as calculated in S109 is not less than the prescribed value P1. If it is judged in this step that the added-up value of the amount of PM allowed to pass through the portion downstream from the filter 10 is less than the prescribed value P1, it is decided that the timing, at which it is to be judged whether the filter 10 is normal or abnormal, does not come yet. Therefore, this routine is once terminated as it is. On the other hand, if it is judged that the added-up value of the amount of PM allowed to pass through the portion downstream from the filter 10 is not less than the prescribed value P1, it is decided that the timing, at which it is to be judged whether the filter 10 is normal or abnormal, comes. Therefore, the routine proceeds to S111. Note that in this embodiment, the predetermined period is terminated at the point in time at which it is judged in S110 that the added-up value of the amount of PM allowed to pass through the portion downstream from the filter 10 is not less than the prescribed value P1.

In S111, the value of the output of the PM sensor 25 is read as the added-up value of the amount of PM allowed to pass through the portion downstream from the filter 10 during the predetermined period, and the value is compared with the threshold value A1. Then, if the value of the output of the PM sensor 25 is not more than the threshold value A1, it is decided that the amount of PM allowed to pass through the filter 10 is sufficiently small. Therefore, the routine proceeds to S112. On the other hand, if the value of the output of the PM sensor 25 is larger than the threshold value A1, it is decided that the amount of PM allowed to pass through the filter 10 is abnormally large. Therefore, the routine proceeds to S113. In this procedure, the threshold value A1 is the value which is derived theoretically or by any experiment or any simulation, as the value with which it is possible to decide that the filter 10 suffers from the failure if the output of the PM sensor 25 is not less than the threshold value A1 upon the termination of the predetermined period as described above. More specifically, the threshold value A1 may be the value which is assumed as the output of the PM sensor 25 at the point in time at which the added-up value of the PM amount allowed to pass through the portion downstream from the filter 10 as calculated in S109 is the prescribed value P1 after the start of the failure diagnostics for the filter 10.

In S112, it is judged that the filter 10 is normal. Further, in S113, it is judged that the filter 10 suffers from any failure. If the process of S112 or S113 is terminated, the routine proceeds to S114. Note that if it is judged in S113 that the filter 10 suffers from any failure, the driver is informed of that fact by means of any method including, for example, indication on a display, indication by voice, and lighting of a lamp.

In S114, the failure diagnostics for the filter is terminated. More specifically, the added-up value of the amount of PM allowed to pass through the portion downstream from the filter 10 and the value of the time count are reset, and the time count is terminated. If the process of S114 is terminated, this routine is once terminated.

As explained above, in this embodiment, when CNG as the gaseous fuel is used during the failure diagnostics for the filter 10, the count is performed, provided that the amount of PM allowed to pass through the portion downstream from the filter is zero in the failure diagnostics for the filter 10. Therefore, the added-up value of the PM amount allowed to pass through the portion downstream from the filter 10 is not increased during the period in which the amount of PM discharged from the internal combustion engine 1 disappears on account of the use of the gaseous fuel. As a result, it is possible to suppress such a situation that the added-up value of the amount of PM allowed to pass through the portion downstream from the filter 10 is different from the actual value and the accuracy of the failure diagnostics for the filter 10 is lowered, on account of the fact that PM is not produced by the internal combustion engine when the gaseous fuel is used.

Note that ECU 20 and the program for executing the processes of S110 to S113 of the filter failure diagnostic routine correspond to the judging means in this embodiment. Further, ECU 20 and the program for executing the processes of S107 to S109 of the filter failure diagnostic routine correspond to the PM amount estimating means in this embodiment.

Embodiment 2

Next, a second embodiment of the present invention will be explained. In the first embodiment, the control has been explained, in which the failure diagnostics for the filter 10 is continued, provided that the PM amount allowed to pass through the portion downstream from the filter 10 is set to zero during the period in which CNG as the gaseous fuel is used in the failure diagnostics for the filter 10. On the contrary, in this embodiment, an explanation will be made about the control in which the failure diagnostics for the filter 10 is started during the use of gasoline as the liquid fuel, and the failure diagnostics for the filter 10 is terminated halfway if CNG as the gaseous fuel is used during the failure diagnostics for the filter 10. Note that also in this embodiment, it is premised that the internal combustion engine 1 can select and use any one of the gaseous fuel and the liquid fuel, but the internal combustion engine 1 does not use any mixed fuel of the gaseous fuel and the liquid fuel.

FIG. 5 shows a flow chart of a filter failure diagnostic routine 2 according to this embodiment. The difference between the flow chart shown in FIG. 5 and the flow chart of the filter failure diagnostic routine explained in the first embodiment resides in that it is judged whether or not only the liquid fuel is being used in S201 after the process of S103 in the filter failure diagnostic routine 2 and that the filter failure diagnostics is terminated if it is judged in Step S106 that CNG as the gaseous fuel is used.

More specifically, in the filter failure diagnostic routine 2, if it is judged in S101 that the failure diagnostics for the filter is not being performed, and it is judged in S103 that the condition to start the failure diagnostics for the filter is established, then it is further judged in S201 whether or not only gasoline as the liquid fuel is being used. Then, if it is judged that only the liquid fuel is not being used, i.e., if it is judged that CNG as the gaseous fuel is used, then this routine is once terminated without starting the failure diagnostics for the filter 10. Accordingly, the failure diagnostics for the filter 10 is carried out only when gasoline as the liquid fuel is used.

Further, if it is judged in S106 that CNG as the gaseous fuel is used, then the routine proceeds to S114, and the failure diagnostics for the filter 10 is terminated halfway. Accordingly, if CNG as the gaseous fuel is used during the execution of the failure diagnostics for the filter 10, it is impossible to perform the failure diagnostics for the filter 10. Therefore, it is possible to more reliably avoid such a situation that the accuracy of the failure diagnostics for the filter 10 is lowered on account of the use of CNG as the gaseous fuel during the execution of the failure diagnostics for the filter 10.

ECU 20 and the program for executing the processes of S110 to S113 of the filter failure diagnostic routine 2 correspond to the judging means in this embodiment. Further, ECU 20 and the program for executing the processes of S107 and S109 of the filter failure diagnostic routine correspond to the PM amount estimating means in this embodiment.

Embodiment 3

Next, a third embodiment of the present invention will be explained. In this embodiment, an explanation will be made about the control in which the failure diagnostics for the filter 10 is started during the use of gasoline as the liquid fuel, wherein the failure diagnostics for the filter 10 is interrupted during the period in which CNG is used if CNG as the gaseous fuel is used during the failure diagnostics for the filter 10, and the failure diagnostics for the filter 10 is restarted from the state of the interruption when the internal combustion engine 1 subsequently starts the use of only gasoline. Note that also in this embodiment, it is premised that the internal combustion engine 1 can select and use any one of the gaseous fuel and the liquid fuel, but the internal combustion engine 1 does not use any mixed fuel of the gaseous fuel and the liquid fuel.

FIGS. 6A and 6B show a flow chart of a filter failure diagnostic routine 3 according to this embodiment. The difference between the flow chart shown in FIGS. 6A and 6B and the flow chart of the filter failure diagnostic routine 2 explained in the second embodiment resides in that if it is judged in Step S106 that CNG as the gaseous fuel is used in the filter failure diagnostic routine 3, the time count and the calculation of the PM amount allowed to pass through the portion downstream from the filter and the added-up value thereof are interrupted instead of proceeding to S114 to terminate the failure diagnostics for the filter 10.

More specifically, if it is judged in S106 of the filter failure diagnostic routine 3 that CNG as the gaseous fuel is used, then the routine proceeds to S202, the time count in the failure diagnostics for the filter 10 is interrupted, and this routine is once terminated. Then, if the use of gasoline is restarted when this routine is executed thereafter, i.e., if it is judged in S106 that the gaseous fuel is not being used, then the routine proceeds to S203, and it is judged whether or not the time count is being interrupted. Then, if the time count is being interrupted, i.e., if the failure diagnostics for the filter 10 is being interrupted, then the routine proceeds to S204, and the time count is restarted. After that, the routine proceeds to S107 and S108, and the calculation of the PM amount allowed to pass through the portion downstream from the filter 10 and the calculation of the added-up value thereof are restarted.

Accordingly, the processes of the failure diagnostics for the filter 10, which has been performed until CNG as the gaseous fuel is used since the start of the failure diagnostics for the filter 10, are not useless. It is possible to complete the failure diagnostics for the filter 10 after the internal combustion engine subsequently starts the use of gasoline as the liquid fuel.

ECU 20 and the program for executing the processes of S110 to S113 of the filter failure diagnostic routine 3 of this embodiment correspond to the judging means in this embodiment. Further, ECU 20 and the program for executing the processes of S107 and S109 of the filter failure diagnostic routine correspond to the PM amount estimating means in this embodiment.

Embodiment 4

Next, a fourth embodiment of the present invention will be explained. In the failure diagnostics for the filter 10 according to this embodiment, such a fact is taken into consideration that PM, which remains in the exhaust system immediately after the fuel in use is switched from gasoline as the liquid fuel to CNG as the gaseous fuel during the failure diagnostics for the filter 10, passes through the portion downstream from the filter 10 thereafter as well, and thus the amount of PM allowed to pass through the portion downstream from the filter 10 does not become zero immediately. Further, such a fact is taken into consideration that PM, which is discharged from the internal combustion engine 1 immediately after the fuel in use is switched again from CNG as the gaseous fuel to gasoline as the liquid fuel, does not begin to pass through the portion downstream from the filter 10, but PM adheres to the exhaust system including, for example, the exhaust pipe and the filter 10, and thus the amount of PM allowed to pass through the portion downstream from the filter 10 does not return to the original amount immediately. Note that also in this embodiment, it is premised that the internal combustion engine 1 can select and use any one of the gaseous fuel and the liquid fuel, but the internal combustion engine 1 does not use any mixed fuel of the gaseous fuel and the liquid fuel.

FIG. 7 shows the change of the amount of PM discharged from the internal combustion engine 1 and the amount of PM allowed to pass through the portion downstream from the filter 10 when such a fact is taken into account that PM, which remains in the exhaust system including, for example, the exhaust pipe 6 and the filter 10 when the fuel in use is switched from gasoline to CNG during the failure diagnostics for the filter 10, passes through the portion downstream from the filter 10, and such a fact is taken into account that PM, which is discharged from the internal combustion engine 1 immediately after the fuel in use is switched again from CNG to gasoline, does not begin to pass through the portion downstream from the filter 10, but PM adheres to the exhaust pipe 6 and the filter 10.

In the drawing, the part indicated by hatched lines is the period in which CNG is used as the fuel in the same manner as in FIG. 3. As shown in the lower part of FIG. 7, PM, which is discharged from the internal combustion engine 1, disappears basically in the first transition period provided immediately after the fuel in use is switched from gasoline to CNG, but a part of PM, which adheres to the exhaust pipe 6 and the filter 10 at that point in time, is exfoliated or peeled off and allowed to pass through the portion downstream from the filter 10. Then, the amount thereof is decreased as the time elapses, and the amount is approximately zero upon the termination of the first transition period.

Further, PM begins to be discharged from the internal combustion engine 1 in the second transition period provided immediately after the fuel in use is switched again from CNG to gasoline. However, the amount of PM, which adheres to the exhaust pipe 6 and the filter 10, is relatively large initially. Therefore, the amount of PM allowed to pass through the portion downstream from the filter 10 is not immediately returned to the original amount, but the amount of PM is gradually increased. Then, the amount of PM, which is allowed to pass through the portion downstream from the filter 10 upon the termination of the second transition period, is equivalent to the amount which is to be provided when gasoline is continuously used as the fuel. In this embodiment, the change of the amount of PM allowed to pass through the portion downstream from the filter 10, which is provided in the first transition period and the second transition period, is taken into account in the failure diagnostics of the filter.

FIGS. 8A and 8B show a flow chart of a filter failure diagnostic routine 4 according to this embodiment. The difference between this routine and the filter failure diagnostic routine shown in FIG. 4 resides in that the processes of S301 to S304 are added after the process of S106.

In this routine, if it is judged in S106 that CNG as the gaseous fuel is used, the routine proceeds to S301. In S301, it is judged whether or not the period is in the middle of the first transition period. In this procedure, as described above, the first transition period is the transitional period provided until the amount of PM allowed to pass through the portion downstream from the filter 10 is approximately zero after the fuel in use is switched from gasoline to CNG. The length thereof may be previously determined theoretically or by any experiment or any simulation. If it is judged in S301 that the period is not the first transition period, i.e., the period is such a period that the amount of PM allowed to pass through the portion downstream from the filter 10 is approximately zero, the routine proceeds to S108. The processes of S108 and the followings have the contents equivalent to those explained in the first embodiment, any explanation of which is omitted in this section.

On the other hand, if it is judged in S301 that the first transition period is provided, the routine proceeds to S302. In S302, the first transition discharge PM amount is calculated, which is the amount of PM allowed to pass through the portion downstream from the filter 10 as brought about by the passage of PM remaining in the exhaust system during the period provided until S302 is executed this time after S302 was executed last time after the switching of the fuel in use from gasoline to CNG. Specifically, the calculation may be performed on the basis of any known calculation formula (computation expression) by using at least one of parameters of the operation state of the internal combustion engine 1 provided before and after the switching of the fuel in use from gasoline to CNG, the exhaust gas flow rate, the exhaust gas temperature, and the estimated value of the PM accumulation amount in the filter 10 in addition to the assumed pass-through ratio of the filter.

Alternatively, the calculation may be substantially performed such that the value of the first transition discharge PM amount corresponding to each of the parameters at that point in time may be read from a map which stores the relationship between at least one of the operation state of the internal combustion engine 1 provided before and after the switching of the fuel in use from gasoline to CNG, the exhaust gas flow rate, the exhaust gas temperature, and the estimated value of the PM accumulation amount in the filter 10 in addition to the assumed pass-through ratio of the filter and the calculated value of the first transition discharge PM amount.

If the process of S302 is terminated, then the routine proceeds to S109, and the added-up value of the amount of PM allowed to pass through the portion downstream from the filter 10 is calculated. More specifically, the first transition discharge PM amount provided on the downstream from the filter 10 as calculated in S302 this time is added to the added-up value of the amount of PM calculated in the process of S109 executed last time in this routine. If the process of S109 is terminated, the process of S110 is executed. The processes of S110 and the followings have the contents equivalent to those explained in the first embodiment, any explanation of which is omitted in this section.

Subsequently, if it is judged in S106 that the gaseous fuel is not being used, the routine proceeds to S303. In S303, it is judged whether or not the period is in the middle of the second transition period. In this section, as described above, the second transition period is the period provided until the amount of PM allowed to pass through the portion downstream from the filter 10 is gradually increased from zero to provide the state of execution of the ordinary operation after the switching of the fuel in use from CNG to gasoline. The length thereof may be previously determined theoretically or by any experiment or any simulation. If it is judged in S303 that the period is not the second transition period, i.e., the period of use of gasoline as the fuel is continued, and the amount of PM allowed to flow through the portion downstream from the filter 10 is not in the transition state but in the state of execution of the ordinary operation, then the routine proceeds to S107. The processes of S107 and the followings have the contents equivalent to those explained in the first embodiment, any explanation of which is omitted in this section.

On the other hand, if it is judged in S303 that the second transition period is provided, the routine proceeds to S304. In S304, the second transition discharge PM amount is calculated, which is the amount of PM allowed to pass through the portion downstream from the filter 10 during the period provided until S304 is executed this time from S304 was executed last time after the switching of the fuel in use from CNG to gasoline.

Specifically, the calculation may be performed on the basis of any known calculation formula (computation expression) by using at least one of parameters of the operation state of the internal combustion engine 1 provided before and after the switching of the fuel in use from CNG to gasoline, the exhaust gas flow rate, the exhaust gas temperature, and the estimated value of the PM accumulation amount in the filter 10 in addition to the assumed pass-through ratio of the filter. Alternatively, the calculation may be substantially performed such that the value of the second transition discharge PM amount corresponding to each of the parameters at that point in time may be read from a map which stores the relationship between at least one of the operation state of the internal combustion engine 1 provided before and after the switching of the fuel in use from CNG to gasoline, the exhaust gas flow rate, the exhaust gas temperature, and the estimated value of the PM accumulation amount in the filter 10 in addition to the assumed pass-through ratio of the filter and the calculated value of the second transition discharge PM amount.

If the process of S304 is terminated, then the routine proceeds to S109, and the added-up value of the amount of PM allowed to pass through the portion downstream from the filter 10 is calculated. More specifically, the second transition discharge PM amount provided on the downstream from the filter 10 as calculated in S304 this time is added to the added-up value of the amount of PM calculated in the process of S109 executed last time in this routine. If the process of S104 is terminated, the process of S110 is executed. The processes of S110 and the followings have the contents equivalent to those explained in the first embodiment, any explanation of which is omitted in this section.

As explained above, in this embodiment, the amount of PM allowed to pass through the portion downstream from the filter 10 during the period is calculated by means of the calculation method which is different from that used for the amount of PM allowed to pass through the portion downstream from the filter 10 in the state in which a sufficient time elapses after the switching of the fuel in use, in the first transition period and the second transition period which are the transition periods provided immediately after the switching of the fuel in use. The obtained amount of PM is used to calculate the added-up value of the amount of PM allowed to pass through the portion downstream from the filter 10. Therefore, the added-up value of the amount of PM allowed to pass through the portion downstream from the filter 10 can be calculated on condition that the transitional phenomenon, which is provided during the switching of the fuel in use, is taken into account. It is possible to perform the failure diagnostics for the filter 10 more accurately.

In this case, it is considered that the following tendency is provided. That is, the first transition discharge PM amount and the second transition discharge PM amount are more increased when the operation state of the internal combustion engine 1 is the state of the higher load and the higher rotation speed, the exhaust gas flow rate is larger, the exhaust gas temperature is higher, the PM pass-through amount determined depending on the assumed pass-through ratio of the filter is larger, and the PM accumulation amount in the filter is larger. The larger the exhaust gas flow rate is, the larger the first transition discharge PM amount and the second transition discharge PM amount are, because it is considered that the amount of PM adhered to the wall surface of the exhaust pipe is more decreased and the amount of PM allowed to pass through the filter is more increased. Further, the higher the exhaust gas temperature is, the larger the first transition discharge PM amount and the second transition discharge PM amount are, because it is considered that the molecular motion becomes more active at the higher exhaust gas temperature, and hence the amount of PM adhered to the wall surface of the exhaust pipe is more decreased.

Note that the program for executing the processes of S107 to S109 of the filter failure diagnostic routine 4 or ECU 20 for executing the same corresponds to the PM amount estimating means. Further, the program for executing the processes of S302, S304, and S109 or ECU 20 for executing the same corresponds to the transition period PM amount estimating means.

Further, in this embodiment, the case has been explained, in which the switching is performed from the state in which only gasoline as the liquid fuel is used to the state in which only CNG as the gaseous fuel is used. However, the application of the present invention is not limited to the case as described above. For example, the present invention can be also applied to a case in which any mixed fuel (blended fuel) is used, wherein the ratio of the fuel injection amount of gasoline as the liquid fuel with respect to the fuel injection amount of CNG as the gaseous fuel is switched.

Embodiment 5

Next, a fifth embodiment will be explained. In this embodiment, an explanation will be made about an example in which the count is performed assuming that the amount of PM allowed to pass through the portion downstream from the filter is set to zero in the failure diagnostics for the filter 10 when CNG as the gaseous fuel is used during the failure diagnostics for the filter 10, but the failure diagnostics for the filter 10 is terminated halfway if a predetermined condition is established during the period in which the failure diagnostics for the filter 10 is interrupted. Note that also in this embodiment, it is premised that the internal combustion engine 1 can select and use any one of the gaseous fuel and the liquid fuel, but the internal combustion engine 1 does not use any mixed fuel of the gaseous fuel and the liquid fuel.

FIGS. 9A and 9B show a flow chart of a filter failure diagnostic routine 5 according to this embodiment. The difference between this routine and the filter failure diagnostic routine shown in FIG. 4 resides in that the processes of S401 to S404 are added after the process of S106.

In this routine, if it is judged in S106 that CNG as the gaseous fuel is used, the routine proceeds to S401. In S401, the applied voltage applied to the PM sensor 25 is raised. Alternatively, if the applied voltage has been already raised, that state is maintained. In accordance therewith, when the PM amount allowed to pass through the portion downstream from the filter 10 is set to zero as shown in S108, then the voltage between the electrodes of the PM sensor 25 is raised, and the electrostatic collecting force is raised. Accordingly, it is possible to suppress the exfoliation of PM accumulated between the electrodes of the PM sensor 25. If the process of S401 is terminated, the routine proceeds to S402.

In S402, it is judged whether or not the change of the output of the PM sensor 25 is not less than a certain value. More specifically, it is judged whether or not the difference between the output value of the PM sensor 25 provided in S402 of last time and the output value of the PM sensor 25 provided this time is not less than the certain value. In this procedure, if it is judged that the change of the output of the PM sensor 25 is not less than the certain value, it is considered that any state change occurs during the period in which the PM amount allowed to pass through the portion downstream from the filter 10 is forced to be zero, for example, such that any foreign matter contained in the exhaust gas adheres to the PM sensor 25 and/or PM accumulated between the electrodes of the PM sensor 25 is exfoliated. Therefore, in such a situation, it is decided to be difficult to accurately perform the failure diagnostics for the filter 10. Therefore, the failure diagnostics for the filter 10 is terminated halfway.

On the other hand, if it is judged in S402 that the output change of the PM sensor 25 is less than the certain value, it is considered that any great state change does not occur during the period in which the PM amount allowed to pass through the portion downstream from the filter 10 is forced to be zero. Therefore, the routine proceeds to S403. Note that the certain value in S402 is the value which is larger than the range of natural variation (natural fluctuation) of the output of the PM sensor 25, and the value is such a threshold value that if the output variation of the PM sensor 25 is not less than the certain value, it is considered that any state change occurs, for example, such that any foreign matter adheres to the PM sensor 25 and/or PM accumulated between the electrodes of the PM sensor 25 is exfoliated. The value of the certain value may be previously determined theoretically or by any experiment or any simulation.

In S403, it is judged whether or not the exhaust gas flow rate of the internal combustion engine 1 is not less than a certain flow rate, or whether or not the exhaust gas temperature is not less than a certain temperature. In this procedure, if it is judged that the exhaust gas flow rate is not less than the certain flow rate, it is considered to be highly probable that PM accumulated between the electrodes of the PM sensor 25 may be exfoliated. Further, if it is judged that the exhaust gas temperature is not less than the certain temperature, it is considered to be highly probable that PM accumulated between the electrodes of the PM sensor 25 may be oxidized and removed. Therefore, in the case of the situations as described above, the failure diagnostics for the filter 10 is terminated halfway. On the other hand, if it is judged that the exhaust gas flow rate is less than the certain flow rate and the exhaust gas temperature is less than the certain temperature, then it is possible to decide that it is hardly probable that PM accumulated on the PM sensor 25 may be exfoliated and/or oxidized and removed, and it is possible to maintain the high accuracy of the failure diagnostics for the filter 10 even when the interruption state of the failure judgment for the filter 10 is continued as it is. Therefore, the routine proceeds to S404.

Note that the certain flow rate provided in S403 is the threshold value with which it is decided that PM accumulated between the electrodes of the PM sensor 25 may be highly possibly exfoliated if the exhaust gas flow rate is not less than the certain flow rate. Further, the certain temperature provided in S403 is the threshold value with which it is decided that PM accumulated between the electrodes of the PM sensor 25 may be highly possibly oxidized and removed if the exhaust gas temperature is not less than the certain temperature. The certain flow rate and the certain temperature may be previously determined theoretically or by any experiment or any simulation.

Subsequently, in S404, it is judged whether or not the operation state based on the engine rotation speed and the engine load of the internal combustion engine 1, which is provided during the period in which the PM amount allowed to pass through the portion downstream from the filter 10 is forced to be zero, is within a certain range in which PM is discharged from the internal combustion engine 1 even when the fuel in use is CNG. In this procedure, if it is judged that the engine rotation speed and the engine load are within the certain range, then any locally rich spot is formed in the combustion chamber 2, or the combustion instability easily arises. It is decided that it is highly probable that PM may be discharged from the internal combustion engine 1 even during the period in which the CNG fuel is used. Therefore, in this case, the failure diagnostics for the filter 10 is once terminated. On the other hand, if it is judged in S404 that the operation state based on the engine rotation speed and the engine load is without the certain range, then any locally rich spot is hardly formed in the cylinder, and the combustion instability hardly arises. It is decided that it is hardly probable that PM may be discharged from the internal combustion engine 1 during the period in which the CNG fuel is used. Therefore, the routine proceeds to the process of S108.

Note that the certain range provided in S404 is the range of the operation state in which any locally rich spot is formed in the combustion chamber and/or the combustion instability easily arises if the operation state based on the engine rotation speed and the engine load is within the certain range, and it is decided that it is highly probable that PM may be discharged from the internal combustion engine 1 even during the period in which the CNG fuel is used. The certain range may be previously determined theoretically or by any experiment or any simulation.

The processes of S108 to S114 of this routine have the contents equivalent to those explained in the first embodiment, any explanation of which is omitted in this section.

As described above, according to this embodiment, it is possible to provide such a situation that the state of PM accumulated on the PM sensor 25 is hardly changed during the period in which the amount of PM allowed to pass through the portion downstream from the filter 10 is forced to be zero. Further, if the state of PM accumulated on the PM sensor 25 may be highly possibly changed, the failure diagnostics for the filter 10 is terminated halfway. Therefore, it is possible to further improve the accuracy of the failure diagnostics for the filter 10.

Note that in this embodiment, the flow has been explained, in which all of the processes of S401 to S404 are performed if the affirmative judgment is made in S106. However, it is also allowable to perform only a part of the processes of S401 to S404. Note that ECU 20 and the program for executing the processes of S110 to S113 of the filter failure diagnostic routine 5 correspond to the judging means in this embodiment. Further, ECU 20 and the program for executing the processes of S107 to S109 of the filter failure diagnostic routine correspond to the PM amount estimating means in this embodiment.

Embodiment 6

Next, a sixth embodiment will be explained. This embodiment resides in the following control as shown in the third embodiment. That is, the failure diagnostics for the filter 10 is started during the use of gasoline as the liquid fuel. If CNG as the gaseous fuel is used during the failure diagnostics for the filter 10, the failure diagnostics for the filter 10 is interrupted. When the internal combustion engine 1 subsequently starts the use of only gasoline, the failure diagnostics for the filter 10 is restarted from the state of the interruption.

Further, in this embodiment, in addition thereto, when CNG as the gaseous fuel is used during the failure diagnostics for the filter 10, if a predetermined condition is established during the period in which the failure diagnostics for the filter 10 is interrupted, then the failure diagnostics for the filter 10 is terminated halfway. Note that also in this embodiment, it is premised that the internal combustion engine 1 can select and use any one of the gaseous fuel and the liquid fuel, but the internal combustion engine 1 does not use any mixed fuel of the gaseous fuel and the liquid fuel.

FIGS. 10A and 10B shows a flow chart of a filter failure diagnostic routine 6 according to this embodiment. The difference between this routine and the filter failure diagnostic routine 3 shown in FIGS. 6A and 6B resides in that the processes of S401 to S404 are added after the process of S106.

In this routine, if it is judged in S106 that CNG as the gaseous fuel is used, then the routine firstly proceeds to S202, and the time count is interrupted, in the same manner as explained in the third embodiment. Then, if the process of S202 is terminated, the routine proceeds to S401. The processes of S401 to S404 have the contents equivalent to those explained in the fifth embodiment, any explanation of which is omitted in this section.

Note that if it is judged in S404 that the engine rotation speed and the engine load are within the certain range, then the routine proceeds to S114, and the failure diagnostics for the filter 10 is terminated halfway. On the other hand, if it is judged in S404 that the operation state based on the engine rotation speed and the engine load is without the certain range, this routine is once terminated as it is.

As described above, according to this embodiment, it is possible to provide such a situation that the state of PM accumulated on the PM sensor 25 is hardly changed during the period in which the failure diagnostics for the filter 10 is interrupted on account of the use of CNG as the gaseous fuel during the failure diagnostics for the filter 10. Further, if the state of PM accumulated on the PM sensor 25 may be highly possibly changed, the failure diagnostics for the filter 10 is terminated halfway. Therefore, it is possible to further improve the accuracy of the failure diagnostics for the filter 10.

Note that also in this embodiment, the flow has been explained, in which all of the processes of S401 to S404 are performed if the affirmative judgment is made in S106. However, it is also allowable to perform only a part of the processes of S401 to S404.

ECU 20 and the program for executing the processes of S110 to S113 of the filter failure diagnostic routine 6 correspond to the judging means in this embodiment. Further, ECU 20 and the program for executing the processes of S107 and S109 of the filter failure diagnostic routine correspond to the PM amount estimating means in this embodiment.

Embodiment 7

Next, a seventh embodiment will be explained. In the first to sixth embodiments described above, the explanation has been made about the case in which the switching is performed from the state in which only gasoline as the liquid fuel is used to the state in which only CNG as the gaseous fuel is used, during the execution of the failure diagnostics for the filter. On the contrary, in this embodiment, an explanation will be made about the control for such a case that the state is changed from the state in which only gasoline as the liquid fuel is used to a state in which mixed fuel of gasoline as the liquid fuel and CNG as the gaseous fuel is used, during the execution of the failure diagnostics for the filter.

The case, in which such a state occurs that the mixed fuel of gasoline and CNG is used during the execution of the failure diagnostics for the filter, is different from those of the first to sixth embodiments described above in that PM, which corresponds to the content ratio of gasoline in the mixed fuel, is discharged from the internal combustion engine 1, and PM passes through the portion downstream from the filter 10, during the use of the gaseous fuel as well. In relation thereto, in this embodiment, when the mixed fuel is used, the amount of PM allowed to pass through the portion downstream from the filter 10 is calculated and added up in accordance with the amount of the liquid fuel used in combination, even during the use of the gaseous fuel.

FIGS. 11A and 11B shows a flow chart of a filter failure diagnostic routine 7 according to this embodiment. The processes of S101 to S106 of this routine have the contents equivalent to those of the processes of the filter failure diagnostic routine explained in the first embodiment, any explanation of which is omitted in this section. If it is judged in S106 of this routine that the gaseous fuel is being used, the routine proceeds to S501.

In S501, it is judged whether or not the fuel in use is the mixed fuel in which gasoline as the liquid fuel and CNG as the gaseous fuel are mixed. If it is judged in S501 that the mixed fuel is being used, the routine proceeds to S502. On the other hand, if it is judged that the mixed fuel is not being used, i.e., if it is judged that all of the fuel is CNG, then the routine proceeds to S108.

In S502, the amount of PM allowed to pass through the portion downstream from the filter 10 is calculated in accordance with the amount of gasoline contained in the mixed fuel. More specifically, ECU 20 calculates the PM amount allowed to pass through the portion downstream from the filter 10 on account of the use of gasoline during the period provided until the point in time of the execution of the filter failure diagnostic routine 5 this time from the point in time of the execution of the filter failure diagnostic routine 7 last time. As for this value, the amount of PM, which is allowed to pass through the portion downstream from the filter 10 during the period provided until the point in time of the execution of the filter failure diagnostic routine this time from the point in time of the execution of the filter failure diagnostic routine last time, may be calculated on the basis of any known calculation formula (computation expression) by using the ratio (for example, % by weight) of gasoline contained in the mixed fuel and at least one of parameters of the operation state of the internal combustion engine 1, the exhaust gas flow rate, the exhaust gas temperature, and the PM amount accumulated in the filter in addition to the assumed pass-through ratio of the filter 10.

Alternatively, the calculation may be substantially performed such that the value of the amount of PM allowed to pass through the portion downstream from the filter 10 corresponding to each of the parameters at that point in time may be read from a map which stores the relationship among at least one of the operation state of the internal combustion engine 1, the exhaust gas flow rate, the exhaust gas temperature, and the estimated value of the PM accumulation amount accumulated in the filter 10 in addition to the assumed pass-through ratio of the filter 10, the ratio (for example, % by weight) of gasoline contained in the mixed fuel, and the calculated value of the amount of PM allowed to pass through the portion downstream from the filter 10. If the process of S502 is terminated, the routine proceeds to S109. The processes of S109 and the followings have the contents equivalent to those of the processes of the filter failure diagnostic routine explained in the first embodiment, any explanation of which is omitted in this section.

As explained above, in this embodiment, when the mixed fuel of the gaseous fuel and the liquid fuel is used, the amount of PM allowed to pass through the portion downstream from the filter 10 is calculated on the basis of the amount of the liquid fuel contained in the mixed fuel. Accordingly, even when the fuel, which is used during the use of the gaseous fuel, is the mixed fuel of the liquid fuel and the gaseous fuel, it is possible to suppress the decrease in the accuracy of the failure diagnostics for the filter 10, in the same manner as the case in which only the gaseous fuel is used.

Note that in the embodiment described above, the explanation has been made about the example in which gasoline is used as the liquid fuel and CNG is used as the gaseous fuel. However, the present invention can be also applied to any combination of the liquid fuel and the gaseous fuel other than the combination of gasoline and CNG.

ECU 20 and the program for executing the processes of S110 to S113 of the filter failure diagnostic routine correspond to the judging means in this embodiment. Further, ECU 20 and the program for executing the processes of S107 to S109 of the filter failure diagnostic routine 7 correspond to the PM amount estimating means in this embodiment.

REFERENCE SIGNS LIST

1: internal combustion engine, 2: combustion chamber, 6: exhaust pipe, 8: exhaust port, 10: filter, 17: CNG supply device, 17a: CNG injection valve, 17b: CNG supply tube, 17c: CNG bomb, 18: gasoline supply device, 18a: gasoline injection valve, 18b: gasoline supply tube, 18c: gasoline tank, 20: ECU, 21: crank position sensor, 22: accelerator position sensor, 24: exhaust gas temperature sensor, 25: PM sensor.

The invention claimed is:
1. A filter failure diagnostic device for an internal combustion engine for performing a failure diagnostics for a filter which collects particulate matter contained in an exhaust gas of the internal combustion engine capable of using gaseous fuel and liquid fuel, the filter failure diagnostic device for the internal combustion engine comprising:
   a PM amount detecting sensor which is provided on a downstream side of the filter in an exhaust gas passage of the internal combustion engine and which detects an added-up amount of the particulate matter contained in the exhaust gas allowed to pass through a portion downstream from the filter; and
   a controller, comprising at least one processor, configured to:
      estimate an added-up amount of the particulate matter contained in the exhaust gas allowed to pass through the portion downstream from the filter in the exhaust gas passage on the basis of a fuel injection amount and a predetermined parameter; and
      judge any failure of the filter in accordance with the added-up amount of the particulate matter contained in the exhaust gas allowed to pass through the portion downstream from the filter as detected by the PM amount detecting sensor during a predetermined period and the added-up amount of the particulate matter contained in the exhaust gas allowed to pass through the portion downstream from the filter as estimated during the predetermined period, and
      wherein the controller is further configured to estimate the added-up amount of the particulate matter contained in the exhaust gas allowed to pass through the portion downstream from the filter in the exhaust gas passage on the basis of the predetermined parameter and only a fuel injection amount of the liquid fuel out of a fuel injection amount of the gaseous fuel and the fuel injection amount of the liquid fuel.
2. The filter failure diagnostic device for the internal combustion engine according to claim 1, wherein:

the predetermined period is a period provided from a start of the estimation of the added-up amount of the particulate matter allowed to pass through the exhaust gas passage on the downstream side of the filter until the added-up amount arrives at a prescribed value; and the controller is configured to judge that the filter suffers from the failure if the added-up amount of the particulate matter contained in the exhaust gas allowed to pass through the portion downstream from the filter, which is provided in the predetermined period and which is detected by the PM amount detecting sensor, is larger than a predetermined threshold value.

3. The filter failure diagnostic device for the internal combustion engine according to claim 1,
wherein the controller is configured to, when the ratio of the fuel injection amount of the liquid fuel with respect to the fuel injection amount of the gaseous fuel is switched during the predetermined period, estimate the added-up amount of the particulate matter contained in the exhaust gas allowed to pass through the portion downstream from the filter, which is provided in the predetermined period by adding a first amount and a second amount, the first amount being an added-up amount of the particulate matter allowed to pass through the exhaust gas passage on the downstream side of the filter in a transition period which appears when a ratio of the fuel injection amount of the liquid fuel with respect to the fuel injection amount of the gaseous fuel is switched and which is provided until change of an amount of the particulate matter allowed to pass through the exhaust gas passage on the downstream side of the filter is converged, and the second amount being an added-up amount of the particulate matter allowed to pass through the exhaust gas passage on the downstream side of the filter in the predetermined period excluding the transition period.

4. The filter failure diagnostic device for the internal combustion engine according to claim 1, wherein:
the failure diagnostics for the filter is started during a period in which the internal combustion engine uses only the liquid fuel; and
if the internal combustion engine is switched halfway through the failure diagnostics for the filter from a state in which the internal combustion engine uses only the liquid fuel to a state in which the internal combustion engine uses only the gaseous fuel, then the failure diagnostics for the filter is interrupted during a period in which the internal combustion engine uses only the gaseous fuel, and the failure diagnostics for the filter is restarted from a state of the interruption when the internal combustion engine subsequently starts use of only the liquid fuel.

5. The filter failure diagnostic device for the internal combustion engine according to claim 1, wherein:
the PM amount detecting sensor is capable of electrostatically collecting the particulate matter by being applied with a voltage;
an electrostatic collecting force of the PM amount detecting sensor for collecting the particulate matter is more increased as the applied voltage is more increased;
the failure diagnostics for the filter is started during a period in which the internal combustion engine uses only the liquid fuel; and
the applied voltage applied to the PM amount detecting sensor is raised during a period in which the internal combustion engine uses only the gaseous fuel, if the internal combustion engine is switched halfway through the failure diagnostics for the filter from a state in which the internal combustion engine uses only the liquid fuel to a state in which the internal combustion engine uses only the gaseous fuel.

6. The filter failure diagnostic device for the internal combustion engine according to claim 1, wherein:
the failure diagnostics for the filter is started during a period in which the internal combustion engine uses only the liquid fuel; and
the failure diagnostics for the filter is terminated halfway if an output signal of the PM amount detecting sensor is changed by not less than a predetermined amount during a period in which the internal combustion engine uses only the gaseous fuel, when the internal combustion engine is switched halfway through the failure diagnostics for the filter from a state in which the internal combustion engine uses only the liquid fuel to a state in which the internal combustion engine uses only the gaseous fuel.

7. The filter failure diagnostic device for the internal combustion engine according to claim 1, wherein:
the failure diagnostics for the filter is started during a period in which the internal combustion engine uses only the liquid fuel; and
the failure diagnostics for the filter is terminated halfway if an exhaust gas temperature of the internal combustion engine is not less than a predetermined temperature or an exhaust gas flow rate of the internal combustion engine is not less than a predetermined flow rate during a period in which the internal combustion engine uses only the gaseous fuel, when the internal combustion engine is switched halfway through the failure diagnostics for the filter from a state in which the internal combustion engine uses only the liquid fuel to a state in which the internal combustion engine uses only the gaseous fuel.

8. The filter failure diagnostic device for the internal combustion engine according to claim 1, wherein:
the failure diagnostics for the filter is started during a period in which the internal combustion engine uses only the liquid fuel; and
the failure diagnostics for the filter is terminated halfway if an operation state of the internal combustion engine belongs to a predetermined operation state included in a range of a rotation speed and a load in which it is feared that the particulate matter may be produced even when the internal combustion engine uses the gaseous fuel during a period in which the internal combustion engine uses only the gaseous fuel, when the internal combustion engine is switched halfway through the failure diagnostics for the filter from a state in which the internal combustion engine uses only the liquid fuel to a state in which the internal combustion engine uses only the gaseous fuel.

9. The filter failure diagnostic device for the internal combustion engine according to claim 1, wherein:
the failure diagnostics for the filter is started during a period in which the internal combustion engine uses only the liquid fuel; and
the failure diagnostics for the filter is terminated halfway if the internal combustion engine uses the gaseous fuel halfway through the failure diagnostics for the filter.

\* \* \* \* \*